United States Patent [19]

Oguchi et al.

[11] Patent Number: 4,921,780
[45] Date of Patent: May 1, 1990

[54] OPTICAL RECORDING MEDIUM

[75] Inventors: Yoshihiro Oguchi, Kawasaki; Tsuyoshi Santoh, Yokohama, both of Japan

[73] Assignee: Canon Kabushiki Kaisha, Tokyo, Japan

[21] Appl. No.: 204,255

[22] Filed: Jun. 9, 1988

[30] Foreign Application Priority Data

Jun. 12, 1987 [JP] Japan .................................. 62-145305
Jun. 15, 1987 [JP] Japan .................................. 62-146975

[51] Int. Cl.$^5$ .............................................. G03G 5/06
[52] U.S. Cl. ................................. 430/495; 430/73; 430/74; 430/76; 430/945
[58] Field of Search ............... 430/495, 945, 73, 74, 430/76

[56] References Cited

U.S. PATENT DOCUMENTS 4,251,613 2/1981 Sasaki .
4,251,614 2/1981 Sasaki .
4,548,886 10/1985 Katagiri et al. ................... 430/945
4,656,121 4/1987 Sato et al. ........................ 430/495

FOREIGN PATENT DOCUMENTS 0264198 4/1988 European Pat. Off. .

Primary Examiner—Paul R. Michl
Assistant Examiner—Thorl Chea
Attorney, Agent, or Firm—Fitzpatrick, Cella, Harper & Scinto

[57] ABSTRACT

An optical recording medium having a recording layer provided on a substrate, said recording layer comprising an organic thin film containing at least one diazulenium salt compound represented by the formula [I], [II] or [III], and a recording method using it.

9 Claims, 1 Drawing Sheet

OPTICAL RECORDING MEDIUM

BACKGROUND OF THE INVENTION

1. Field of the Invention

This invention relates to an optical recording medium which is suitable for writing recording with laser beam, particularly semiconductor laser beam, more particularly to an optical recording medium which can be used for optical disc or optical card technique.

2. Related Background Art

Generally speaking, an optical recording medium such as optical disc or optical card can record information at a high density by forming small pits of, for example, about 1 μm which can be optically detected on a thin recording layer provided on a substrate having spiral, circular, linear grooves, etc.

When the laser beam converged on the surface of the recording layer is scanned, the recording layer absorbs the laser energy to form optically detectable pits, whereby information is written.

For example, according to the heat mode recording system, the recording layer absorbs heat energy and can form small concave pits by evaporation or melting at that site. According to another heat mode recording system, by absorption of the laser energy irradiated, pits having optically detectable density difference can be formed at that site.

As the optical recording medium to be used for this kind of optical recording and reproducing device, there has been known one constituted of a substrate, a metal reflective layer and a recording layer containing a dye. This optical recording medium is formed so that the laser beam incident on the recording layer containing a dye may reach the metal reflective layer and the reflected light reflected thereagainst can be easily detected, and in this case, the metal reflective layer is provided for supplementing the amount of reflected light which is defficient with only the recording layer.

However, presence of the metal reflective layer makes the constitution of the optical recording medium complicated, and is also a cause for high cost.

In contrast, the above problems can be solved by use of an organic dye thin film as the recording layer with high reflectance.

Particularly, when an azulene type dye disclosed in U.S. Pat. No. 4,548,886 is used as one having great light absorption relative to laser beam, a light absorptive reflective film exhibiting metallic luster (reflectance: 10-50%) can be obtained, whereby an optical recording medium capable of laser recording and also capable of reflective reading can be obtained.

Particularly, when a semiconductor laser with oscillation wavelength of 700 to 800 nm is used as a laser light source, miniaturization and reduction in cost of the device is rendered possible.

SUMMARY OF THE INVENTION

An object of the present invention is to provide an optical recording medium having an organic thin film which has high sensitivity and is also stable to heat and light, having great absorption and high reflection characteristic in the oscillated wavelength of laser beam, particularly an absorption band on the longer wavelength side.

Another object of the present invention is to provide an optical recording medium having an organic thin film stable to heat and light.

More specifically, according to one aspect of the present invention, there is provided an optical recording medium having a recording layer provided on a substrate, said recording layer comprising an organic thin film containing at least one diazulenium salt compound represented by the formula [I], [II] or [III] shown below.

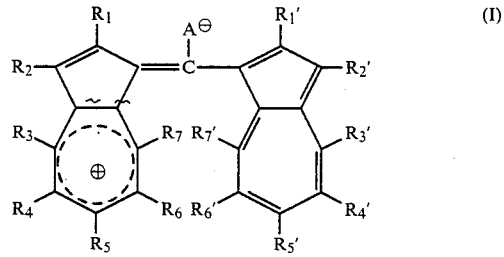

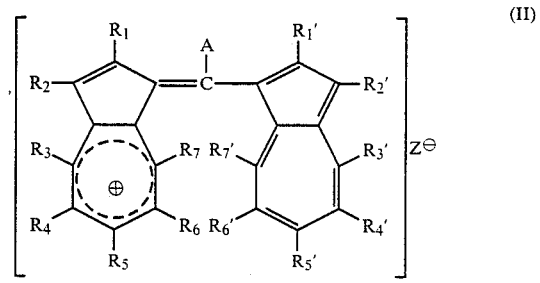

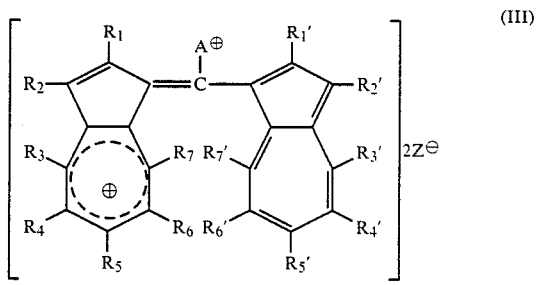

wherein $R_1$–$R_7$ and $R_1'$–$R_7'$ each represent hydrogen atom, a halogen atom or monovalent organic residue, or at least one combination of the combinations of $R_1$ and $R_2$, $R_2$ and $R_3$, $R_3$ and $R_4$, $R_4$ and $R_5$, $R_5$ and $R_6$, $R_6$ and $R_7$, $R_1$ and $R_2'$, $R_2'$ and $R_3'$, $R_3'$ and $R_4'$, $R_4'$ and $R_5'$, $R_5'$ and $R_6'$, $R_6'$ and $R_7'$ may form a substituted or an unsubstituted fused ring; A represents a monovalent organic residue and $z\ominus$ represents an anion residue.

According another aspect of the present invention, there is provided a recording method comprising using an optical recording medium having a recording layer provided on a substrate, said recording layer comprising an organic thin film containing at least one diazulenium salt compound represented by the formula [I], [II] or [III] shown above and performing recording by irradiating a semiconductor laser on said recording layer.

DETAILED DESCRIPTION OF THE INVENTION

Figure 1:
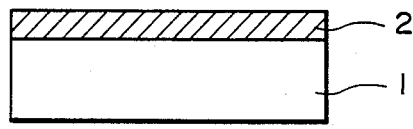
FIG. 1, FIG. 2, FIG. 3 and FIG. 4 each represent a sectional view showing an embodiment of the present invention.

In the diazulenium salt compounds represented by the formulae [I], [II] and [III] contained in the recording layer in the present invention, $R_1$-$R_7$ and $R_1'$-$R_7'$ each represent a hydrogen atom, a halogen atom (chlorine, bromine, iodine atom) or monovalent organic residue. Such monovalent organic residue can be selected from a wide scope of compounds, particularly there may be included alkyl groups (methyl, ethyl, n-propyl, isopropyl, n-butyl, t-butyl, n-amyl, n-hexyl, n-octyl, 2-ethylhexyl, t-octyl, etc.), alkoxy groups (methoxy, ethoxy, propoxy, butoxy, etc.), substituted or unsubstituted aryl groups (phenyl, tolyl, xylyl, ethylphenyl, methoxyphenyl, ethoxyphenyl, chlorophenyl, nitrophenyl, dimethylaminophenyl, α-naphthyl, β-naphthyl, etc.), substituted or unsubstituted aralkyl groups (benzyl, 2-phenylethyl, 2-phenyl-1-methylethyl, bromobenzyl, 2-bromophenylethyl, methylbenzyl, methoxybenzyl, nitrobenzyl), acyl groups (acetyl, propionyl, butylyl, vareryl, benzoyl, toluoyl, naphthoyl, phthaloyl, furoyl, etc.), substituted or unsubstituted amino groups (amino, dimethylamino, diethylamino, dipropylamino, acetylamino, benzoylamino, etc.), substituted or unsubstituted styryl groups (styryl, dimethylaminostyryl, diethylaminostyryl, dipropylaminostyryl, methoxystyryl, ethoxystyryl, methylstyryl, etc.), nitro groups, hydroxy groups, carboxyl groups, cyano groups or substituted or unsubstituted arylazo groups (phenylazo, α-nephthylazo, β-naphthylazo, dimethylaminophtnylazo, chlorophenylazo, nitrophenylazo, methoxyphenylazo, tolylazo, etc.).

Of the combinations of $R_1$ and $R_2$, $R_2$ and $R_3$, $R_3$ and $R_4$, $R_4$ and $R_5$, $R_5$ and $R_6$, $R_6$ and $R_7$, $R_1'$ and $R_2'$, $R_2'$ and $R_3'$, $R_3'$ and $R_4'$, $R_4'$ and $R_5'$, $R_5'$ and $R_6'$, $R_6'$ and $R_7'$ at least one combination may also form a substituted or unsubstituted fused ring. The fused ring may be a 5-, 6- or 7-membered fused ring, including aromatic rings (benzene, naphthalene, chlorobenzene, bromobenzene, methylbenzene, ethylbenzene, methoxybenzene, ethoxybenzene, etc.), heterocyclic rings (furan ring, benzofuran ring, pyrrole ring, thiophene ring, pyridine ring, quinoline ring, thiazole ring, etc.), aliphatic rings (dimethylene, trimethylene, tetramethylene, etc.). $Z^\ominus$ represents an anion residue.

$R_1$-$R_7$ and $R_1'$-$R_7'$ may either the same or different.

A represents a monovalent organic residue. Specific examples of azulenium salts containing such A may include those represented by the following formulae (1)-(11). In the formulae, $Q^\oplus$ represents diazulenium salt nucleus shown below, and the right side excluding $Q^\oplus$ represents A.

Diazulenium salt nucleus ($Q^\oplus$)

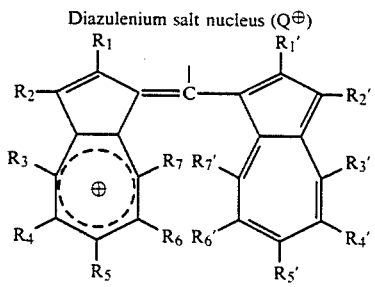

Formula (1)

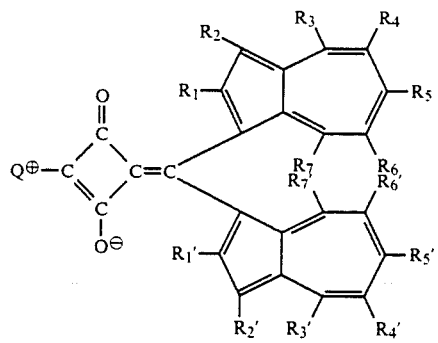

In the formula, $R_1$-$R_7$ and $R_1'$-$R_7'$ have the same definitions as defined above.

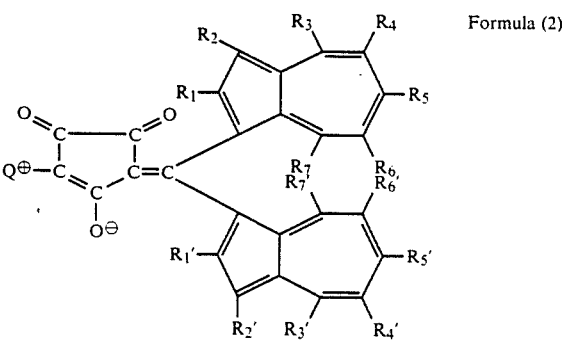

Formula (2)

In the formula, $R_1$-$R_7$ and $R_1'$-$R_7'$ have the same definitions as defined above.

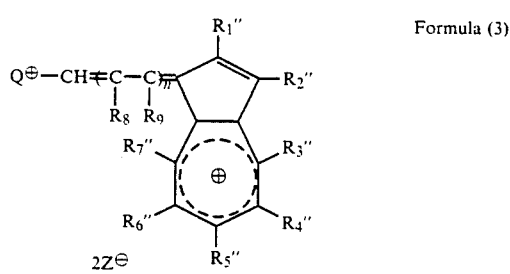

Formula (3)

In the formula, $R_1''$-$R_7''$ have the same definitions as $R_1$-$R_7$ defined above.

$Z^\ominus$ represents an anion residue, for example, anions such as chloride ion, bromide ion, iodide ion, perchlorate ion, nitrate ion, benzene sulfonate ion, p-toluenesulfonate ion, methyl sulfate ion, ethyl sulfate ion, propyl sulfate ion, tetrafluoroborate ion, tetraphenylborate ion, hexafluorophosphate ion, benzene sulfinate ion, acetate ion, trifluoroacetate ion, propionacetate ion, benzoate ion, oxalate ion, succinate ion, malonate ion, oleinate ion, stearate ion, citrate ion, monohydrogen diphosphate ion, dihydrogen monophosphate ion, pentachlorostannate ion, chlorosulfonate ion, fluorosulfonate ion, trifluoromethanesulfonate ion, hexafluoroarsenate ion, hexafluoroantimonate ion, molybdenate ion, tungstate ion, titanate ion, zirconate ion, etc.

$R_8$ and $R_9$ each represent hydrogen atom, a halogen atom, nitro group, cyano group, an alkyl group (methyl, ethyl, propyl, butyl, etc.) or an aryl group (phenyl, tolyl, xylyl, etc.) and n represents ° 1 or 2.

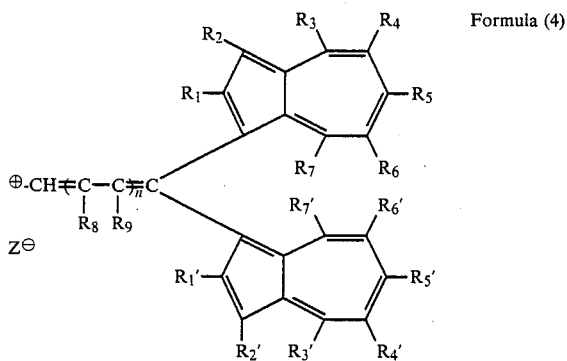

Formula (4)

In the formula, $R_1$–$R_7$ and $R_1'$–$R_7'$ have the same definitions as defined above, and the diazulenium salt nucleus represented by $Q^\oplus$ and the diazulenium salt nucleus on the right side in the formula (4) may be either symmetric or asymmetric.

$R_8$, $R_9$ and $Z^\ominus$ have the same definitions as defined above, and n represents 0, 1 or 2.

Formula (5)

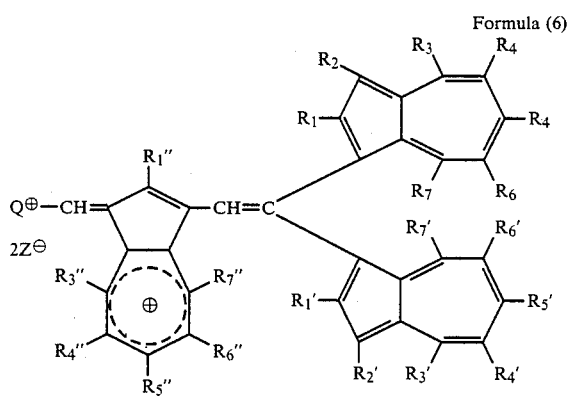

Formula (6)

In the formula, $R_1$–$R_7$, $R_1'$–$R_7'$, $R_1''$–$R_7''$ and $Z^\ominus$ have the same definitions as defined above. The azulemium salt nucleus represented by $Q^\oplus$ and the diazulene salt nucleus on the right side in the formula (6) may be either symmetric or asymmetric.

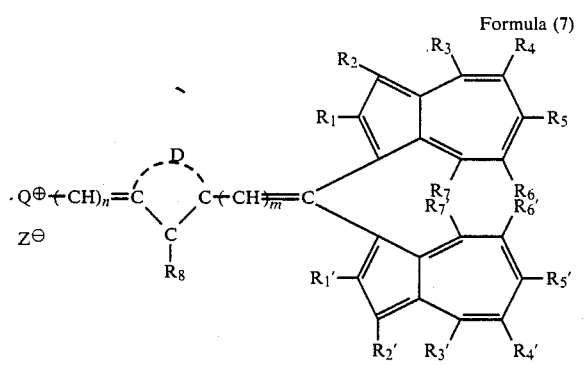

Formula (7)

In the formula, $R_1$–$R_7$, $R_1'$–$R_7'$, $r_8$ and $Z^\ominus$ have the same definitions as defined above. The azulemium salt nucleus represented by $Q^\oplus$ and the diazulene salt nucleus on the right side in the formula (7) may be either symmetric or asymmetric.

D represents a divalent hydrocarbon group (for example, —CH$_2$—CH$_2$—, —CH$_2$—CH$_2$—CH$_2$—,

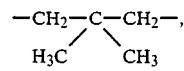

—CH=CH—, etc.) for forming a substituted or unsubstituted 5- or 6-membered ring, and may be also fused to these 5- or 6-membered benzene ring, naphthalene ring, etc. n and m represent 1, 2 or 3.

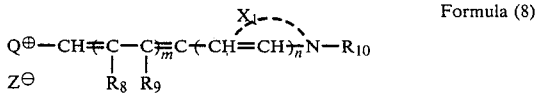

Formula (8)

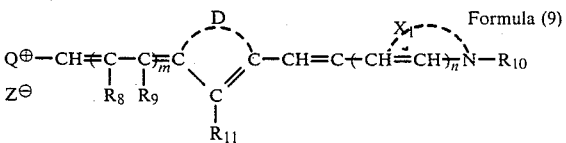

Formula (9)

In for formulae (8), (9), $X_1$ represents a group of non-metal atoms necessary for completing a nitrogen containing heterocyclic ring such as pyridine, thiazole, benzothiazole, naphthothiazole, oxazole, benzooxazole, naphthooxazole, imidazole, benzimidazole, naphthoimidazole, 2-quinoline, 4-quinoline, isoquinoline or indole, and such heterocyclic group may be substituted with halogen atoms (chlorine, bromine, iodine atoms), alkyl groups (methyl, ethyl, propyl, butyl, etc.), aryl groups (phenyl, tolyl, xylyl, etc.), and others. R10 represents an alkyl group (methyl, ethyl, propyl, butyl, etc.), a substituted alkyl group (2-hydroxyethyl, 2-methoxyethyl, 2-ethoxyethyl, 3-hydroxypropyl, 3-methoxypropyl, 3-ethoxypropyl, 3-chloropropyl, 3-bromopropyl, 3-carboxypropyl, etc.), a cyclic alkyl group (cyclohexyl, cyclopropyl), allyl, aralkyl groups (benzyl, 2-phenylethyl, 3-phenylpropyl, 4-phenylbutyl, α-naphthylmethyl, δ-naphthylmethyl), a substituted aralkyl group (methylbenzyl, ethylbenzyl, dimethylbenzyl, trimethylbenzyl, chlorobenzyl, bromobenzyl, etc.), an aryl group (phenyl, tolyl, xylyl, α-naphthyl, β-naphthyl) or a substituted aryl group (chlorophenyl, dichlorophenyl, trichlorophenyl, ethylphenyl, methoxyphenyl, dimethoxyphenyl, aminophenyl, nitrophenyl, hydroxyphenyl, etc.). m represents 0, 1 or 2, and $R_8$, $R_9$, $R_{11}$ and $Z^\oplus$ have the same definitions as defined above.

$$Q^\oplus\text{—CH}\mathrel{\overset{=}{=}}\text{CH—CH}\mathrel{\overset{=}{\underset{m}{}}}{}^\oplus R_{12}$$
$$2Z^\ominus$$

Formula (10)

In the formula, $R_{10}$ represents a substituted or unsubstituted aryl group (phenyl, tolyl, xylyl, biphenyl, α-naphthyl, β-naphthyl, anthralyl, pyrenyl, methoxyphenyl, dimethoxyphenyl, trimethoxyphenyl, ethoxyphenyl, diethoxyphenyl, chlorophenyl, dichlorophenyl, trichlorophenyl, bromophenyl, dibromophenyl, tribromophenyl, ethylphenyl, diethylphenyl, nitrophenyl, aminophenyl, dimethylaminophenyl, diethylaminophenyl, dibenzylaminophenyl, dipropylaminophenyl, morpholinophenyl, piperidinylphenyl, pyperadinophenyl, diphenylaminophenyl, acetylaminophenyl, benzoylaminophenyl, acetylphenyl, benzoylphenyl, cyanophenyl, etc.). $Z^{\ominus}$ has the same definition as defined above. m represents 0, 1 or 2.

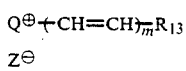

Formula (11)

In the formula, $R_{13}$ represents a monovalent heterocyclic group derived from a heterocyclic ring such as furan, thiophene, benzofuran, thionaphthene, dibenzofuran, carbazole, phenothiazine, phenoxazine, pyridine, etc., $Z^{\ominus}$ has the same definition as defined above. m represents 0, 1 or 2.

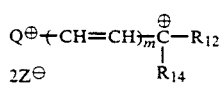

Formula (12)

In the formula, $R_{14}$ represents an alkyl group (methyl, ethyl, propyl, butyl, etc.) or a substituted or unsubstituted aryl group (phenyl, tolyl, xylyl, biphenyl, ethylphenyl, chlorophenyl, methoxyphenyl, ethoxyphenyl, nitrophenyl, aminophenyl, dimethylaminophenyl, diethylaminophenyl, acetylaminophenyl, α-naphthyl, β-naphthyl, anthralyl, pyrenyl, etc.). $R_{12}$ and $Z^{\ominus}$ have the same definitions as defined above. m represents 1 or 2.

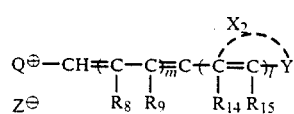

Formula (13)

In the formula, $X_2$ represents a group of atoms necessary for completing pyran, thiapyran, selenapyran, benzopyran, benzothiapyran, benzoselenapyran, naphthopyran, naphtothiapyran or naphthoselenapyran which may be also substituted. l is 0 and 1. Y represents a sulfur atom, an oxygen atom or selenium atom. $R_{14}$ and $R_{15}$ each represent hydrogen atom (methyl, ethyl, propyl, butyl, etc.), an alkoxy group (methoxy, ethoxy, propoxy, butoxy, etc.), a substituted or unsubstituted aryl group (phenyl, tolyl, xylyl, chlorophenyl, biphenyl, methoxyphenyl, etc.), a substituted or unsubstituted styryl group (styryl, p-methylstyryl, o-chlorostyryl, p-methoxystyryl, etc.), a substituted or unsubstituted 4-phenyl-1,3-butadienyl group (4-phenyl-1,3-butadienyl, 4-(p-methylphenyl)-1,3-butadienyl, etc.) or a substituted or unsubstituted heterocyclic group (quinolyl, pyridyl, carbazolyl, furyl, etc.). $R_8$, $R_9$, m and $Z^{\ominus}$ have the same definitions as defined above.

In the following, specific examples of the diazulenium salt compound used in the present invention are enumerated below.

Exemplary compounds represented by the above formula (1)—

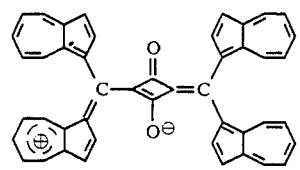
(1)

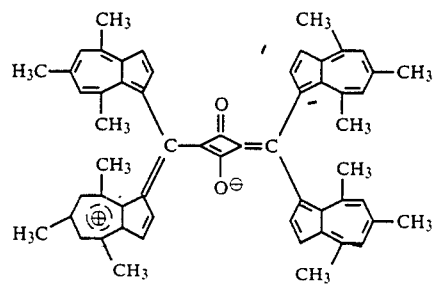
(2)

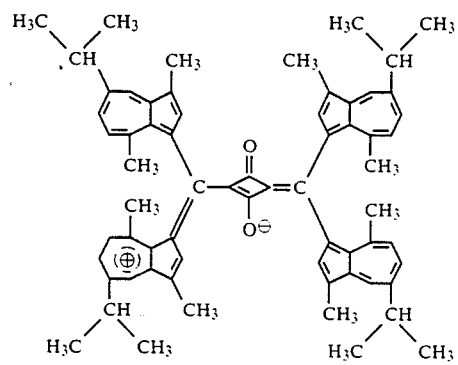
(3)

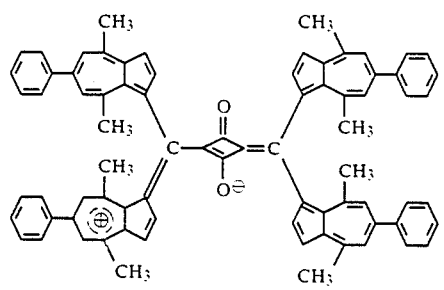
(4)

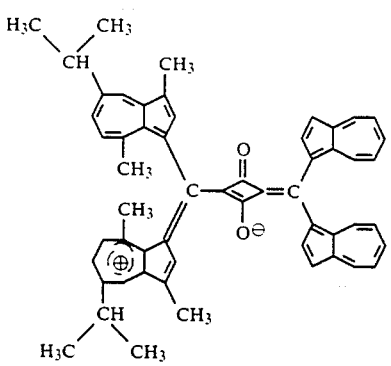
(5)

Exemplary compounds represented by the above formula (2)

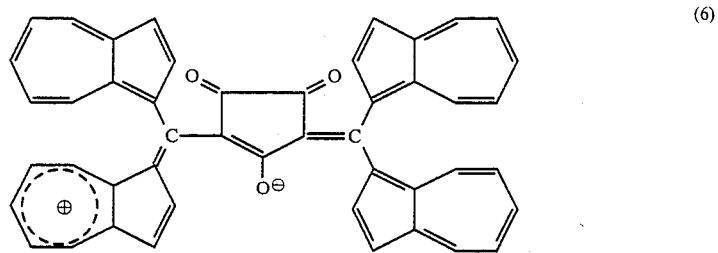
(6)
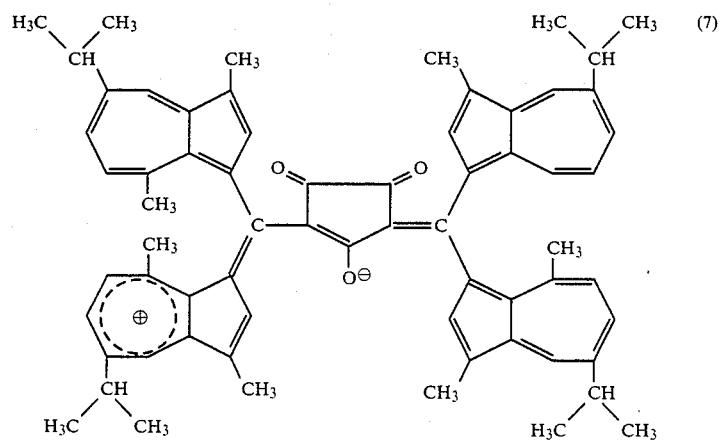
(7)
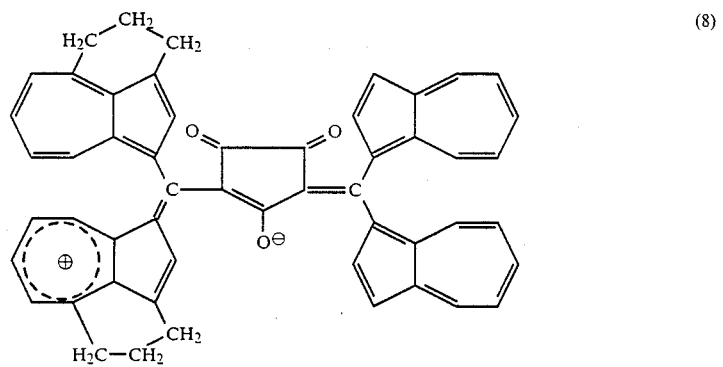
(8)
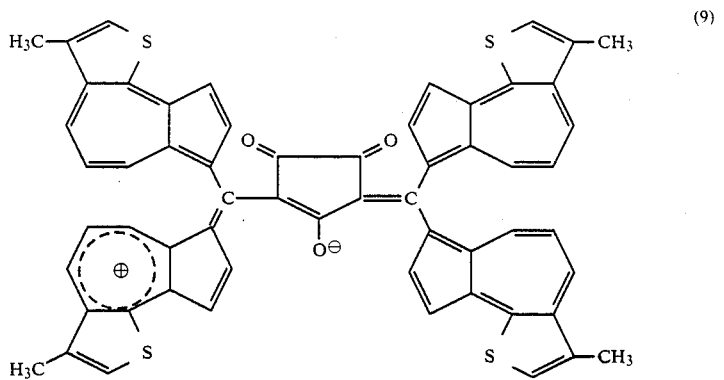
(9)

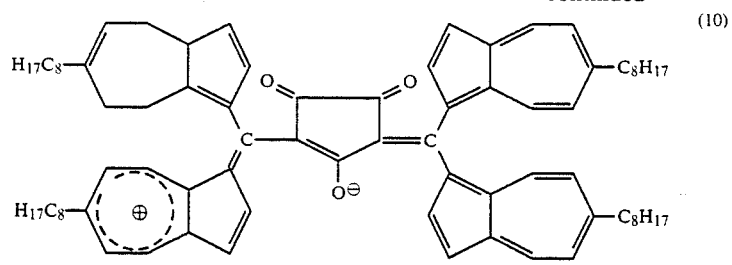
(10)
Exemplary compounds represented by the above formula (3)
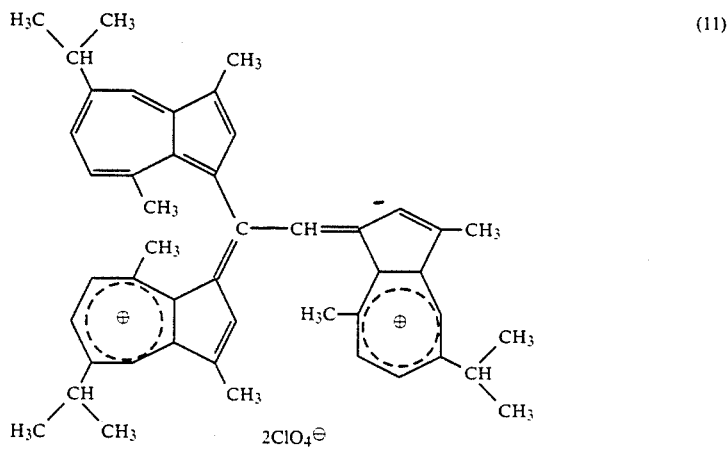
(11)
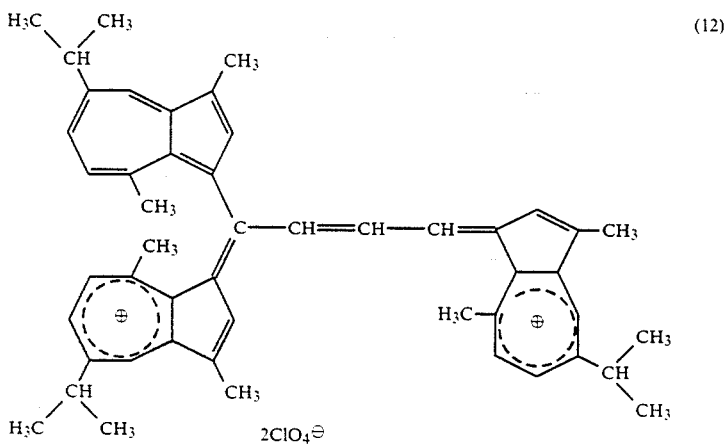
(12)
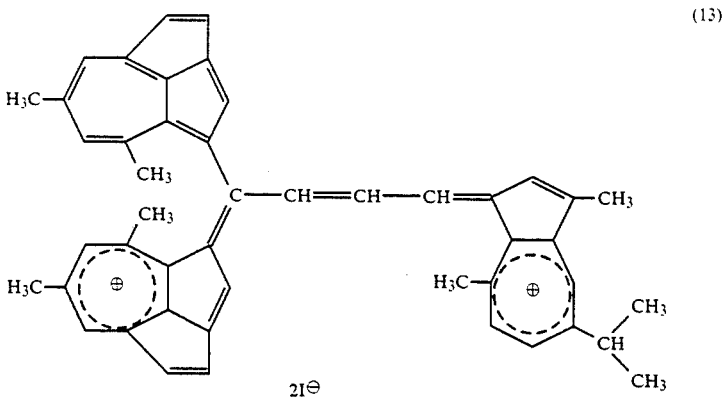
(13)

-continued
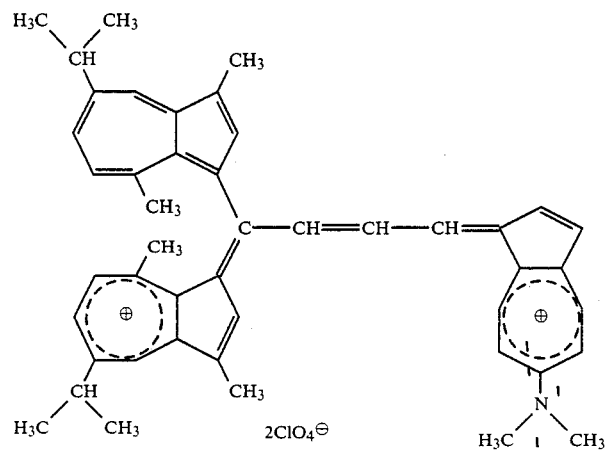
(14)
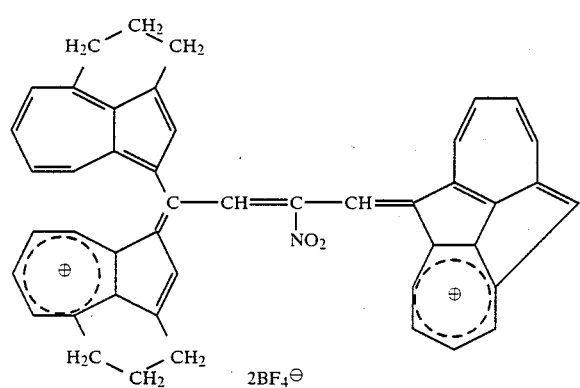
(15)
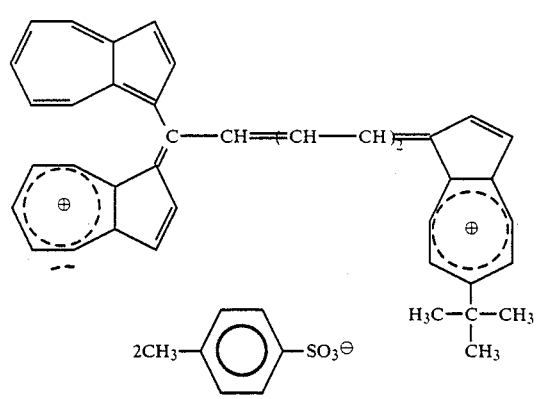
(16)

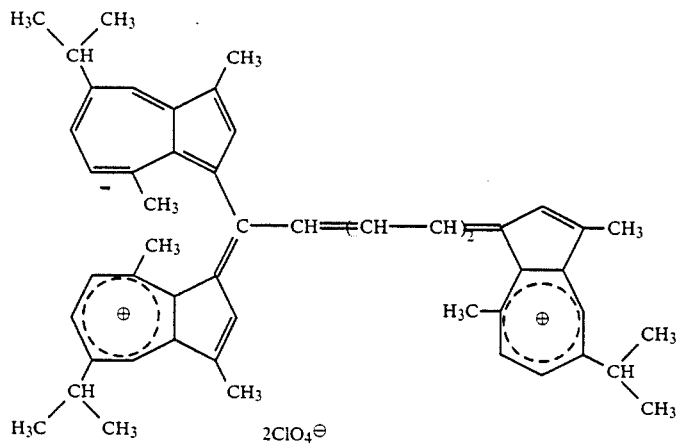
(17)
Exemplary compounds represented by the above formula (4)—
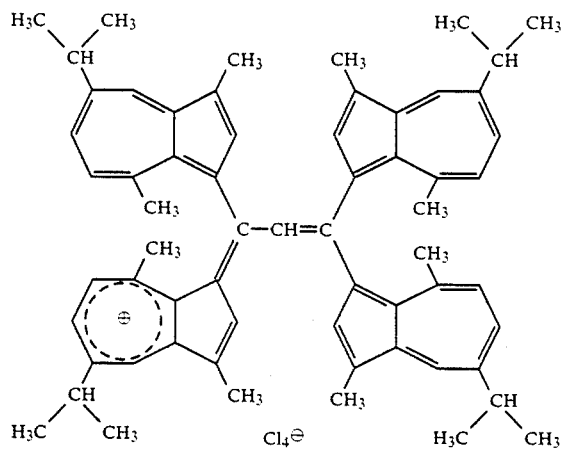
(18)
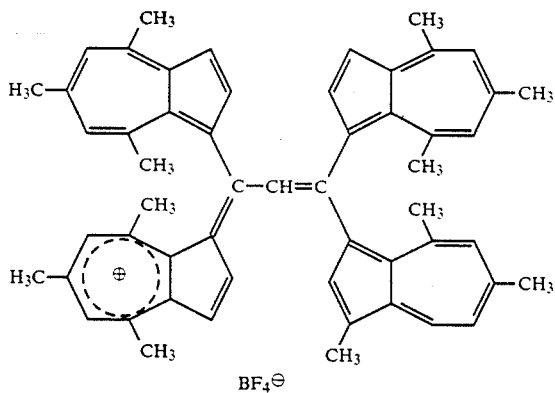
(19)

(20)
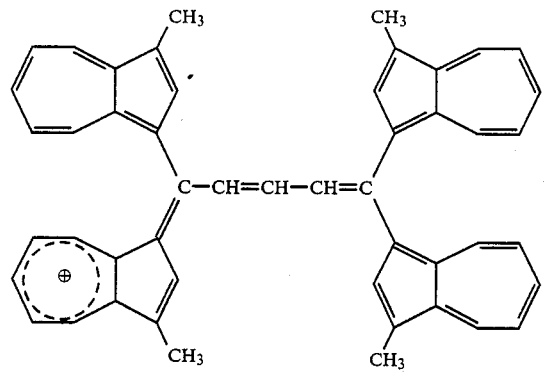
BF$_4^\ominus$
(21)
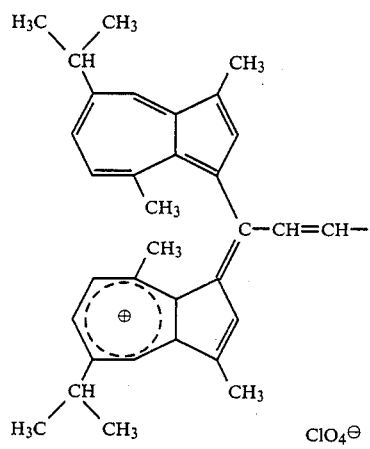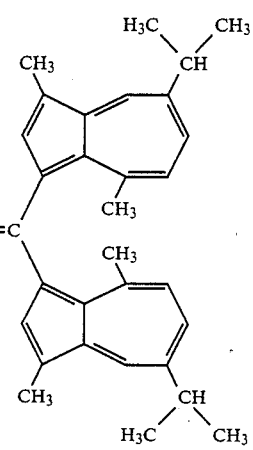
ClO$_4^\ominus$
(22)
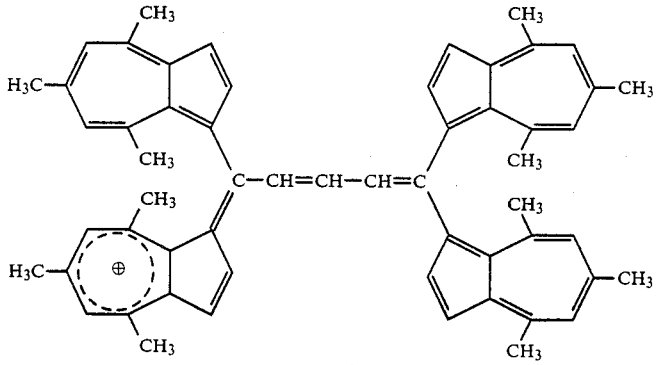
I$^\ominus$
(23)
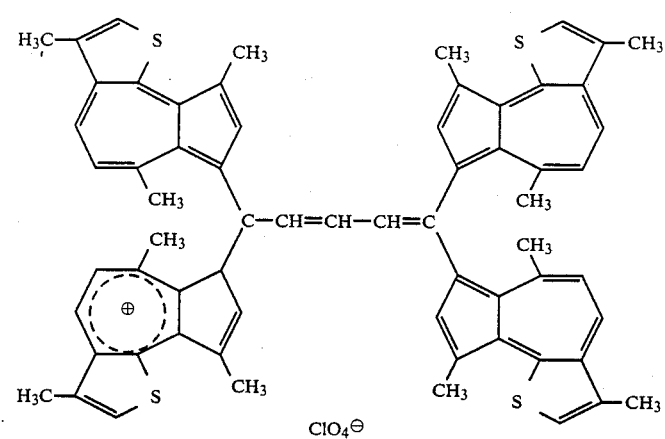
ClO$_4^\ominus$ -continued
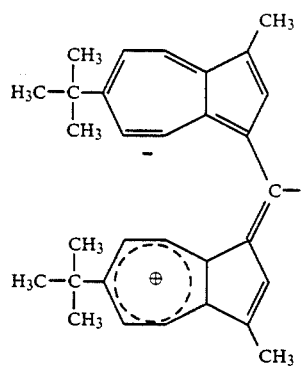
(24)
BF₄⁻
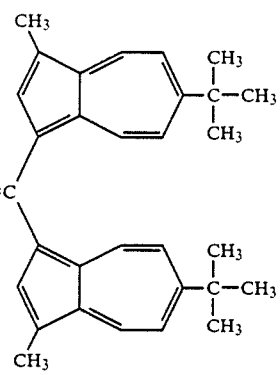
(25)
I⁻
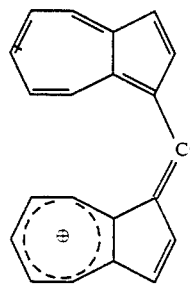
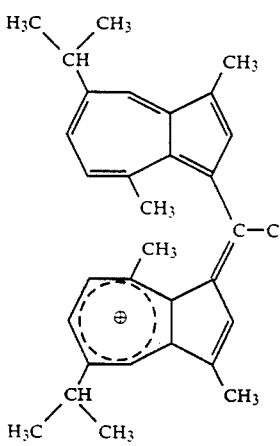
(26)
ClO₄⁻
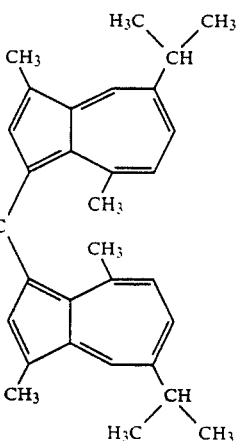
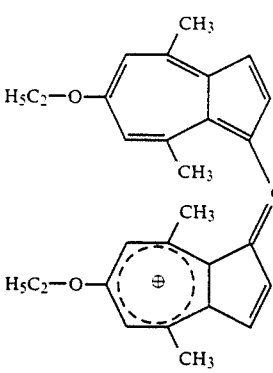
(27)
ClO₄⁻
Exemplary compounds represented by the above formula (5)—

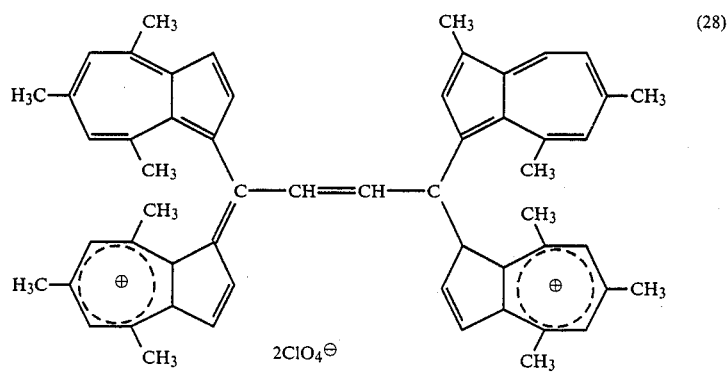
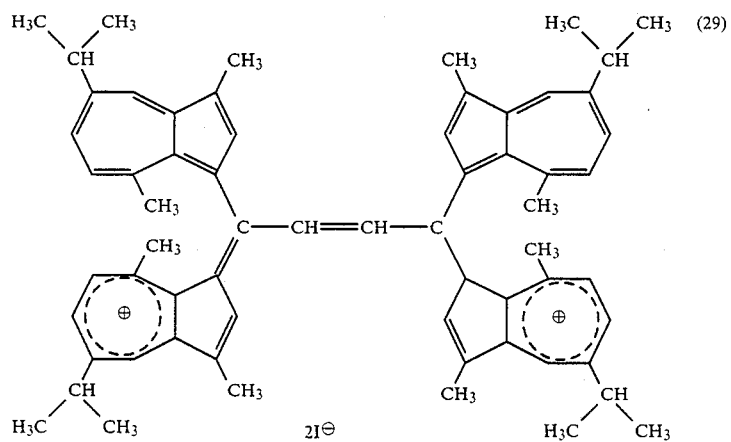
Exemplary compounds represented by the formula (6)—
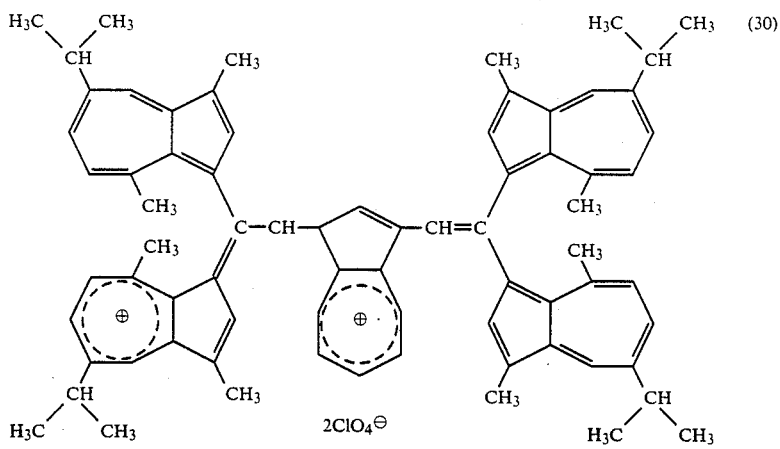

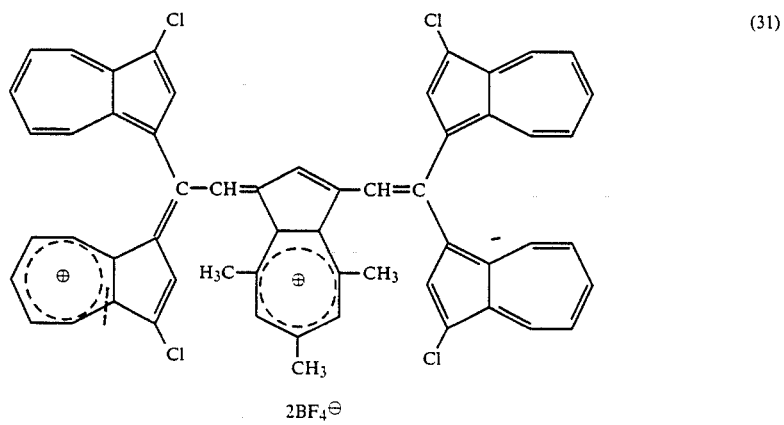
(31)
Exemplary compounds represented by the above formula (7)—
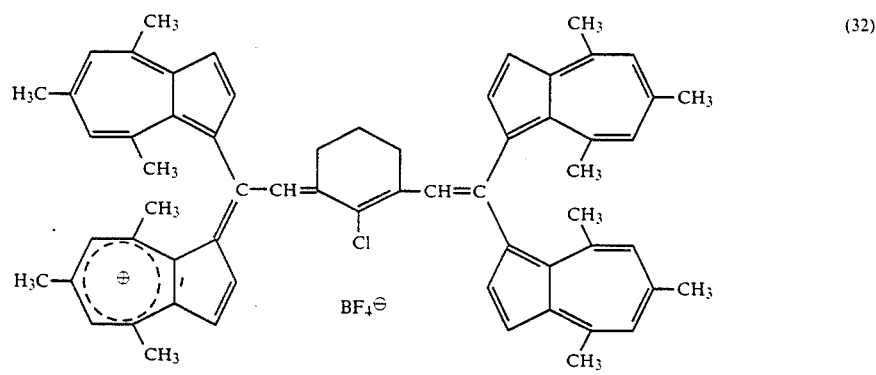
(32)
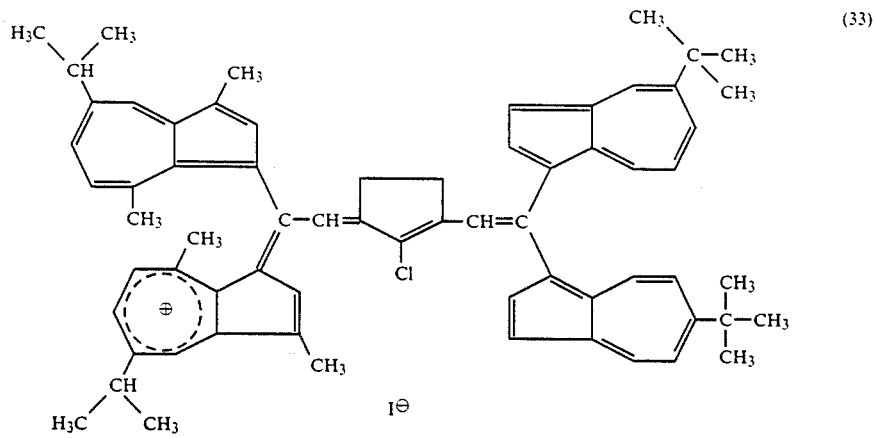
(33)

-continued
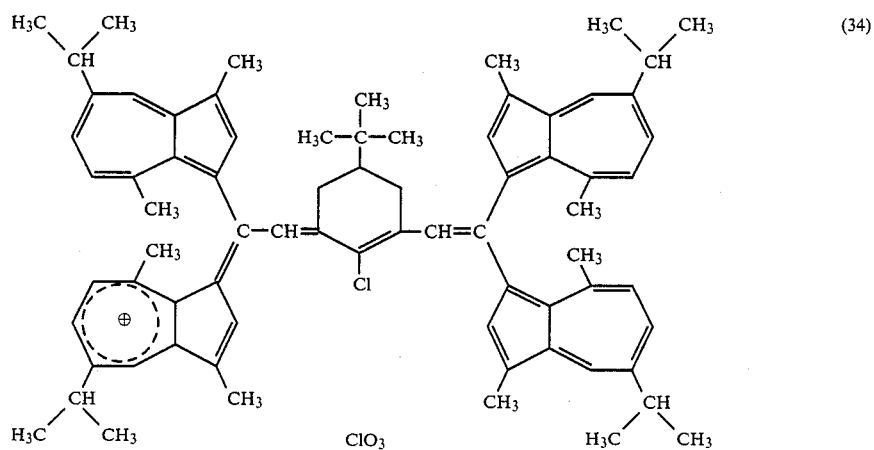
(34)
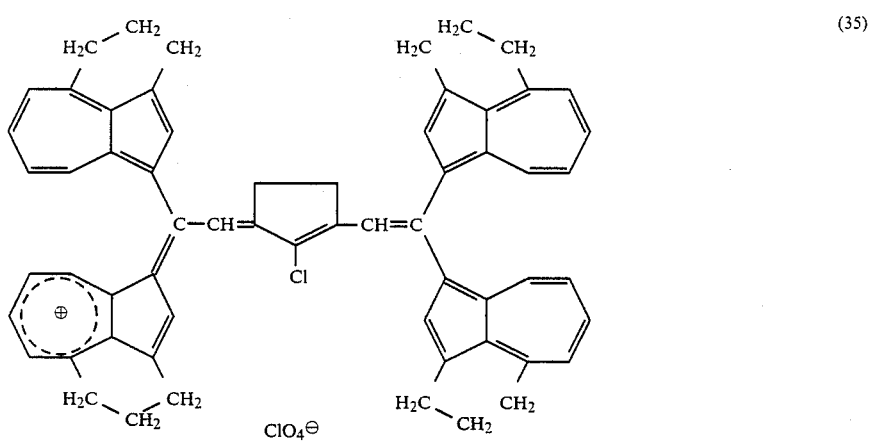
(35)
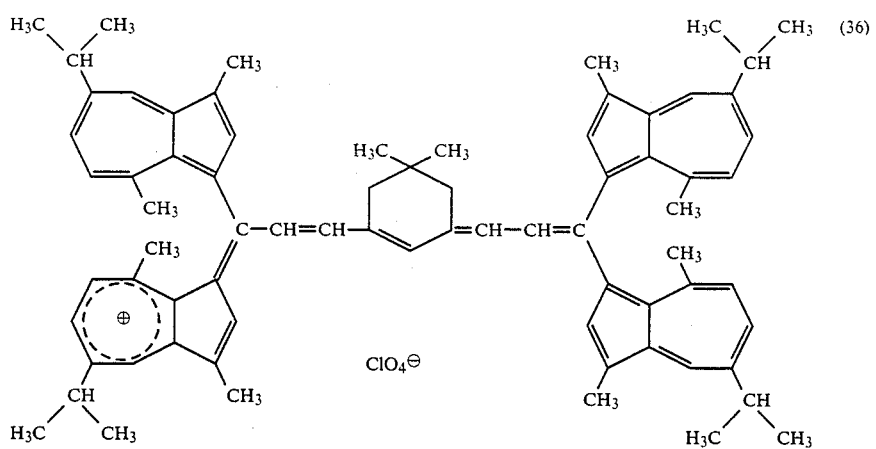
(36)

(37)
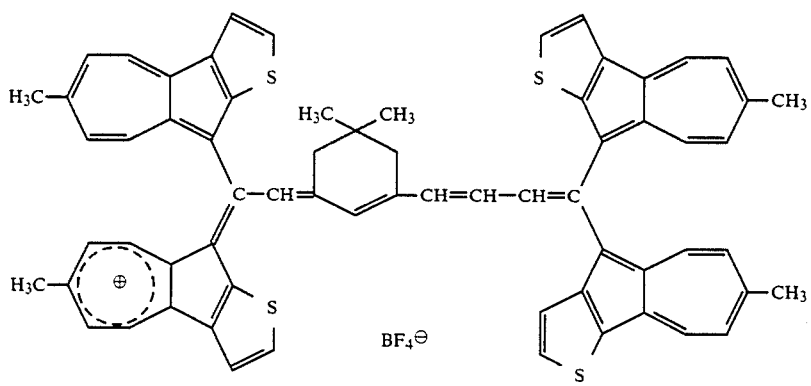
Exemplary compounds represented by the above formulas (8) and (9)—
(38)
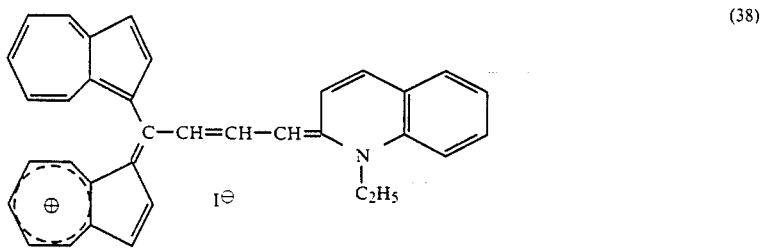
(39)
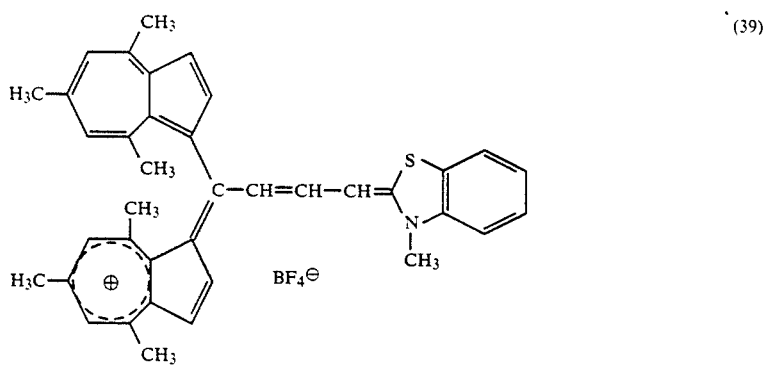
(40)
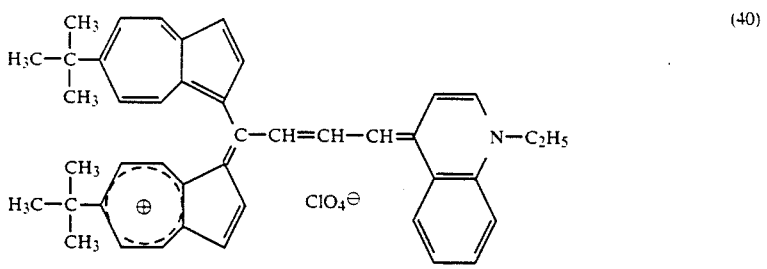

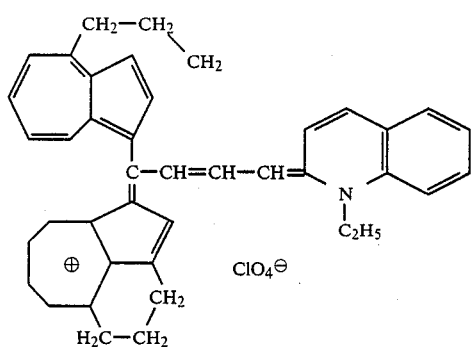
(41)
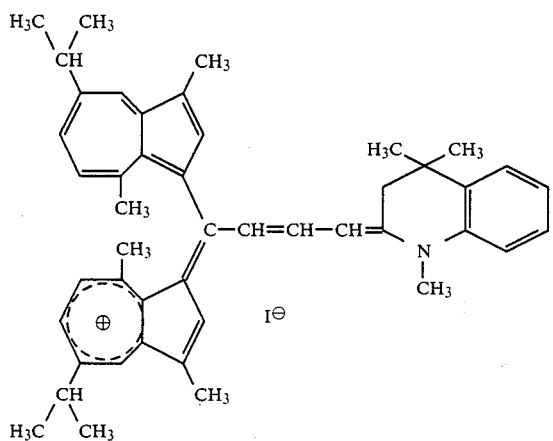
(42)
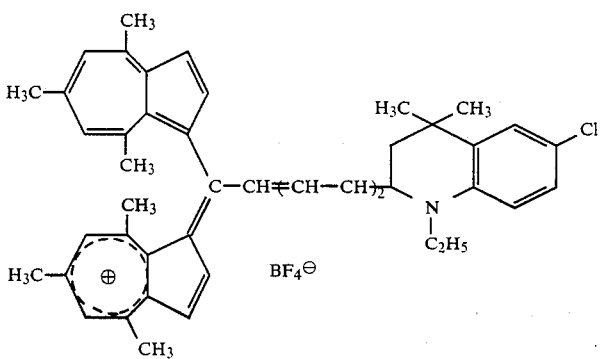
(43)
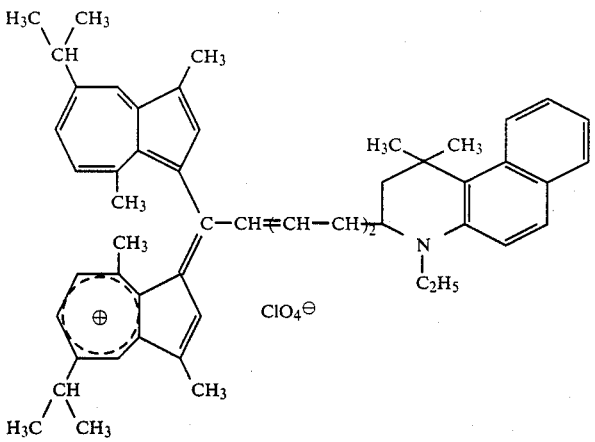
(44)

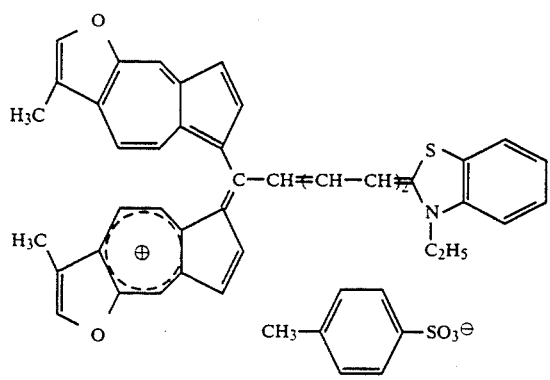
(45)
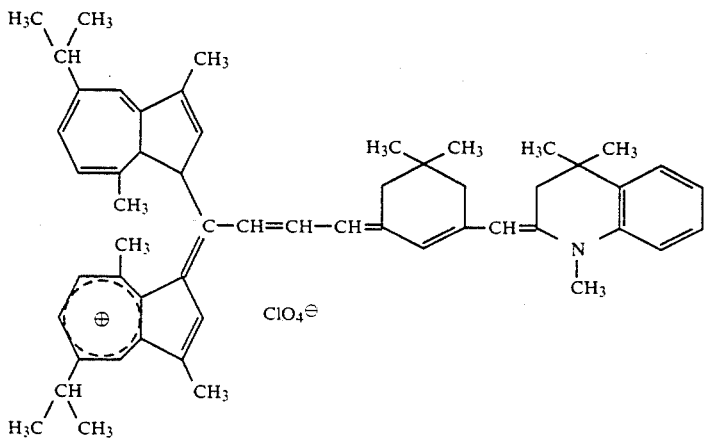
(46)
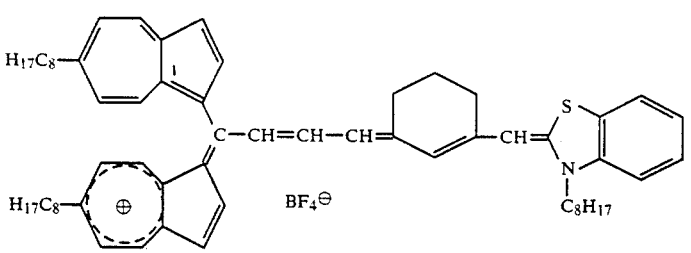
(47)
Exemplary compounds represented by the above formula (10)—
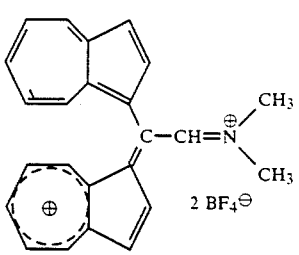
(48)

-continued
(49)
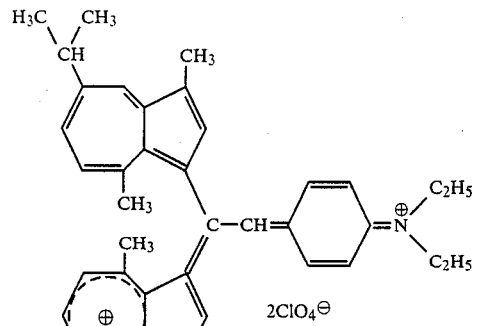
(50)
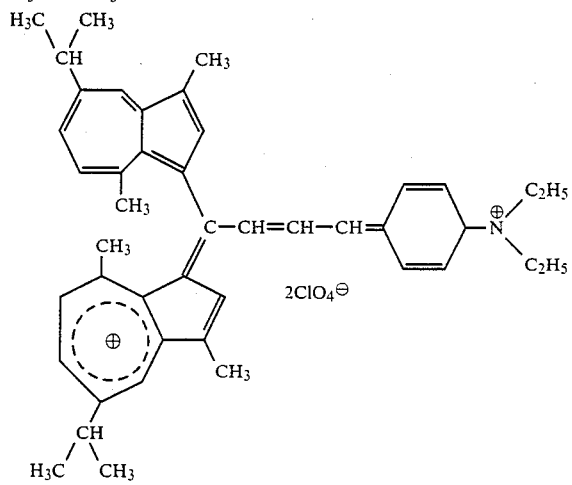
(51)
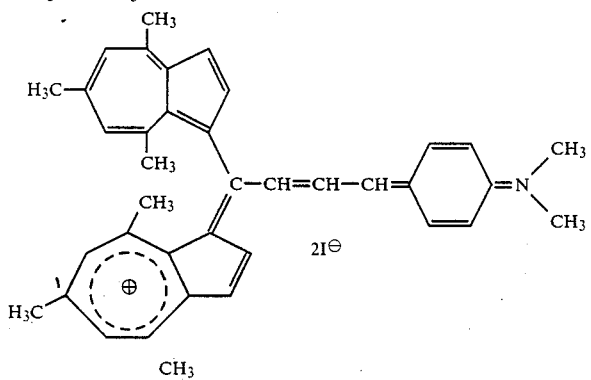
(52)
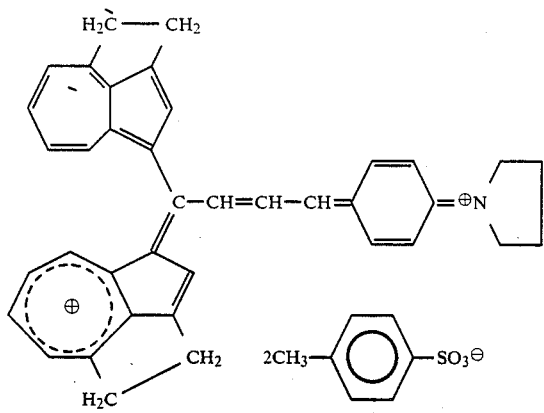

-continued
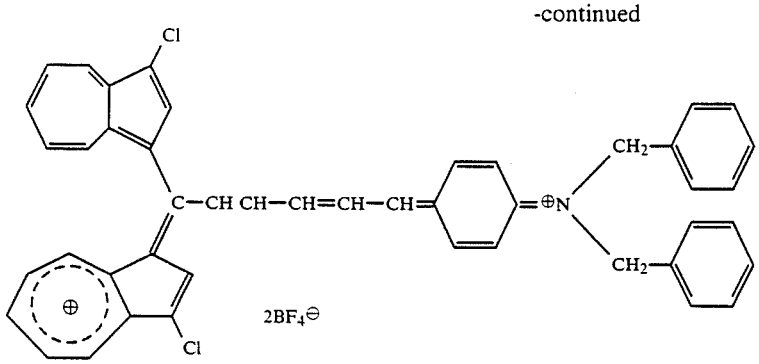
(53)
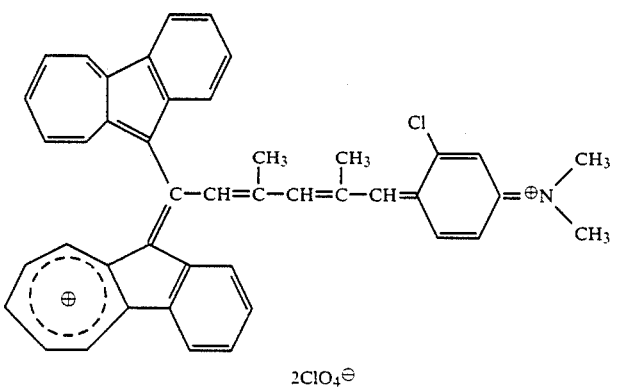
(54)
Exemplary compounds represented by the above formula (11)—
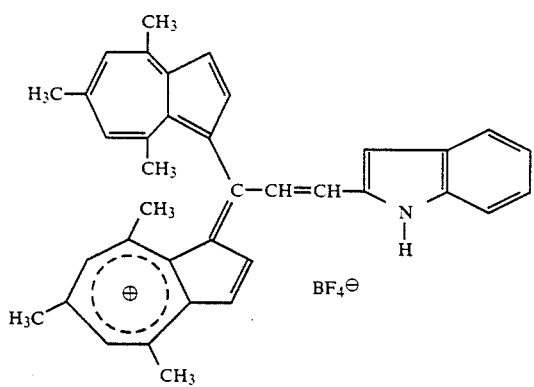
(55)
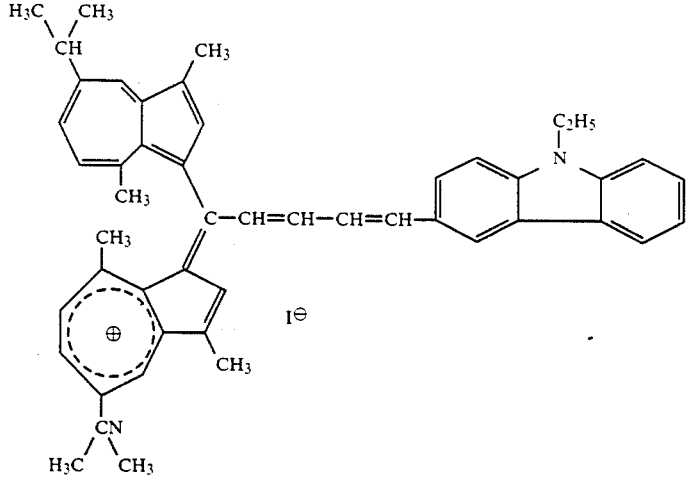
(56)

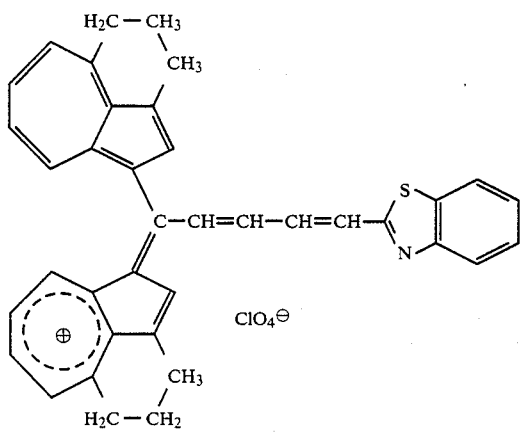
(57)
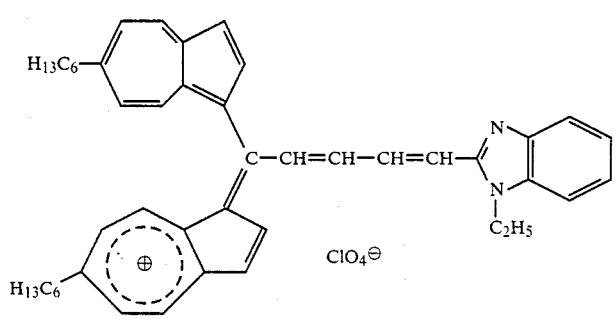
(58)
Exemplary compounds represented by the above formula (12)
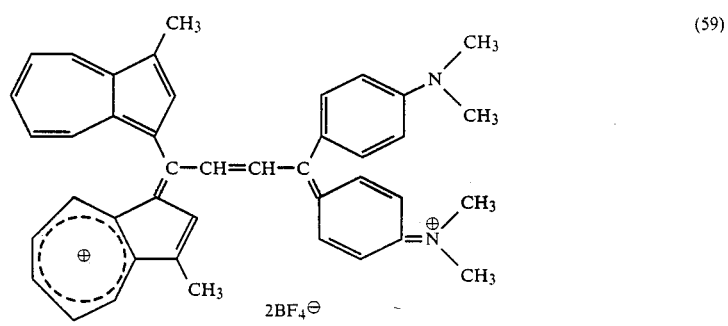
(59)
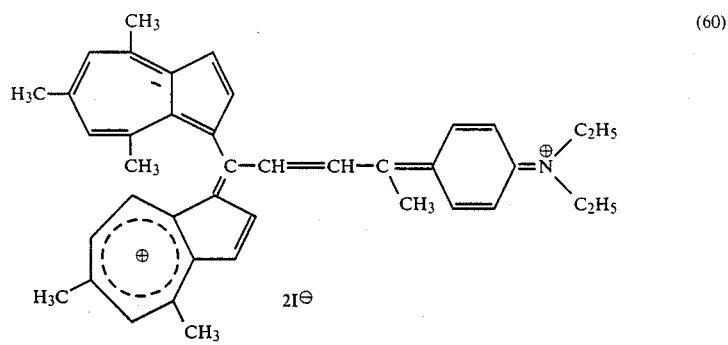
(60)

-continued
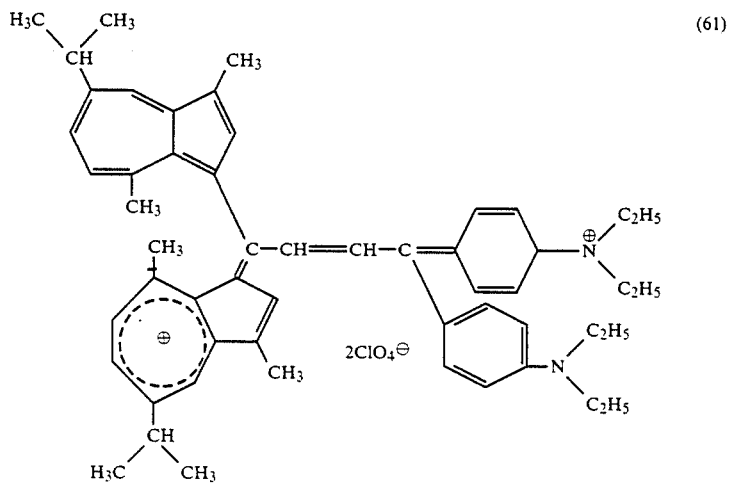
(61)
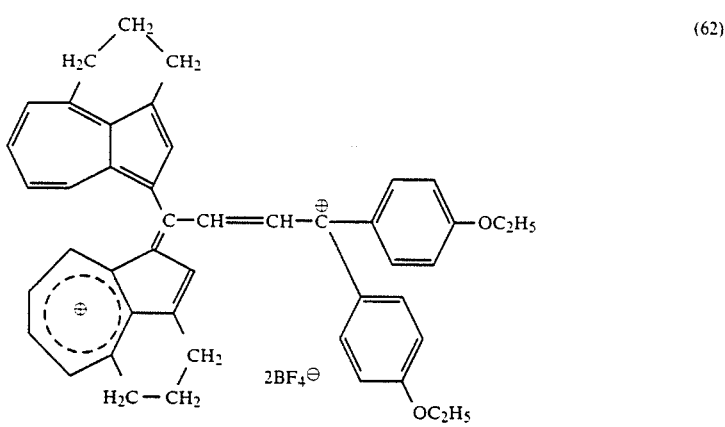
(62)
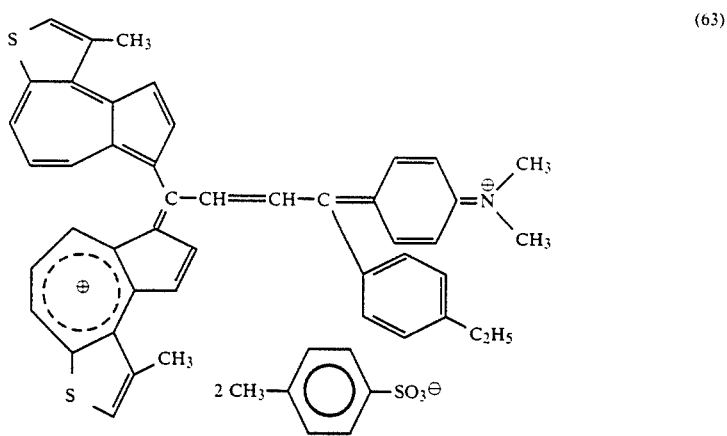
(63)

(64)
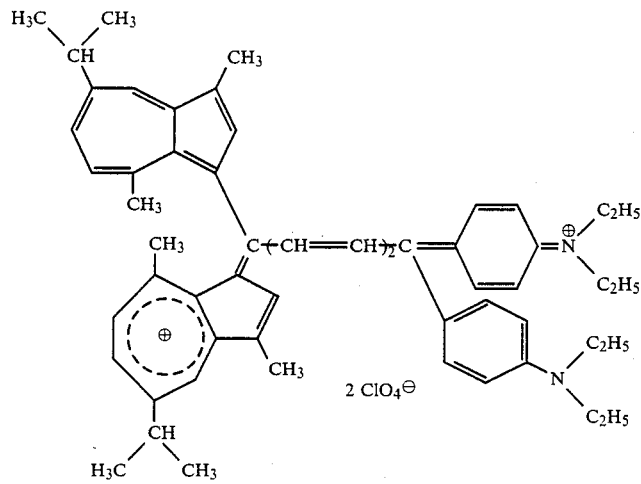
(65)
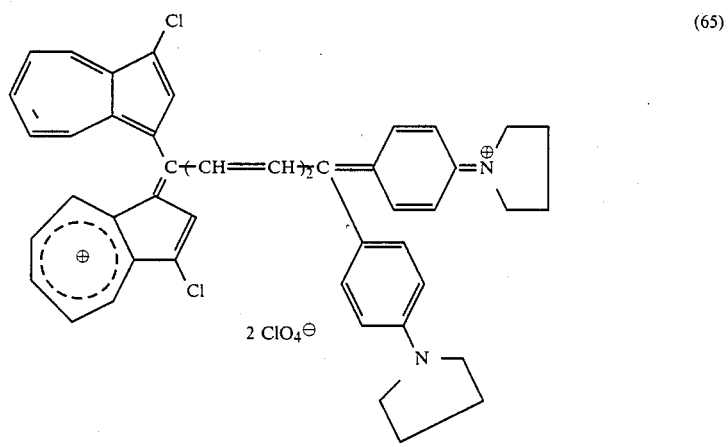
(66)
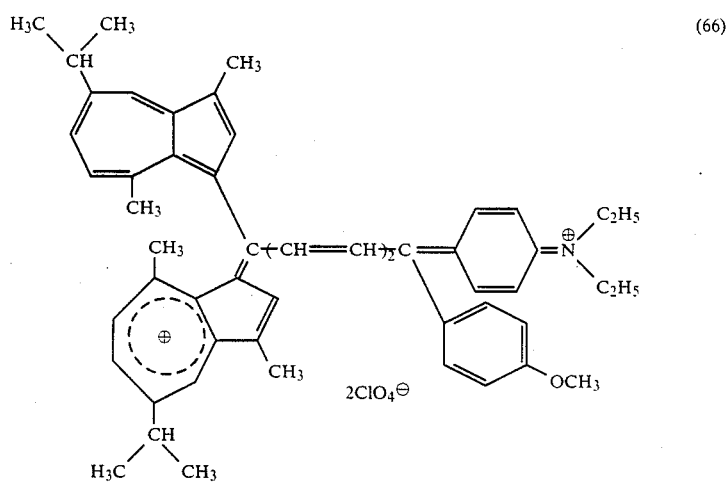
Exemplary compounds represented by above formula (13)

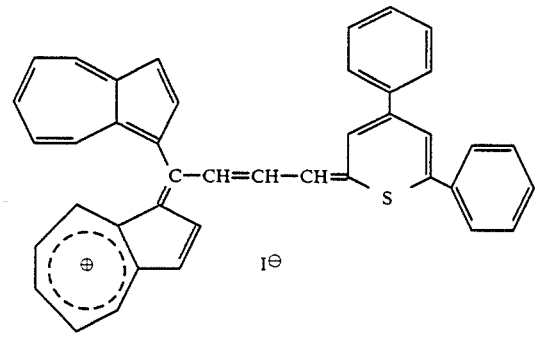
(67)
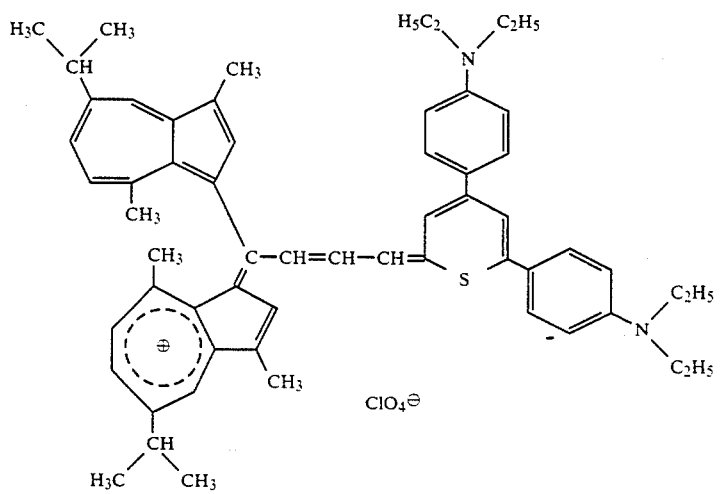
(68)
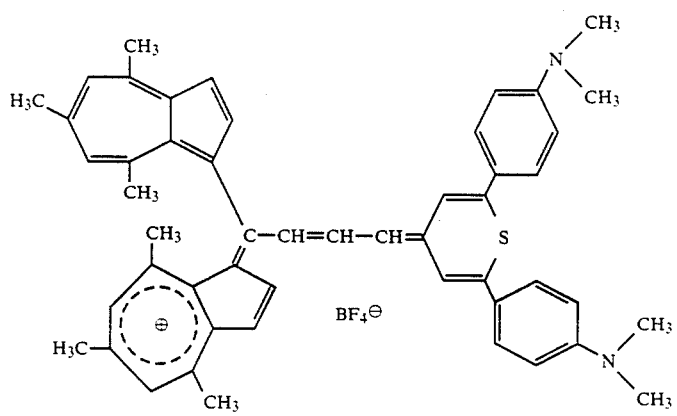
(69)
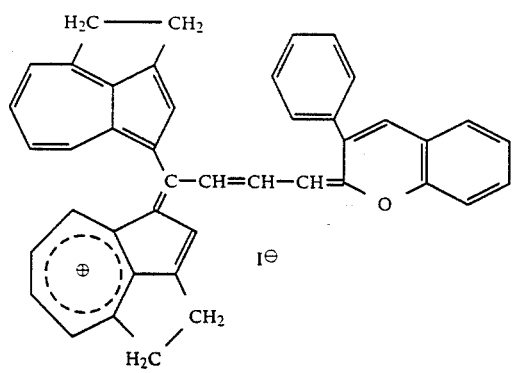
(70)

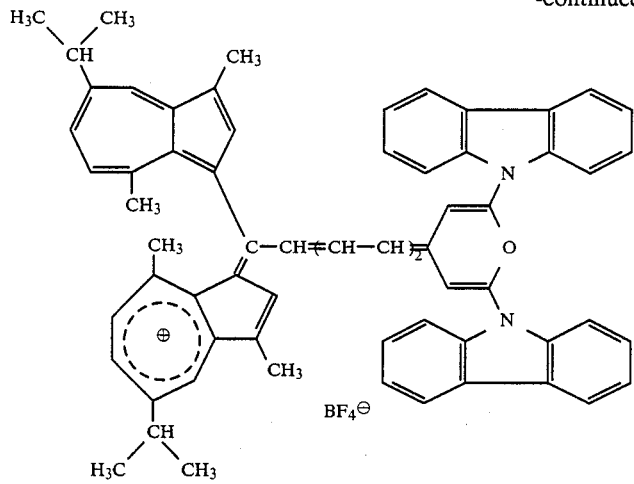

(71)

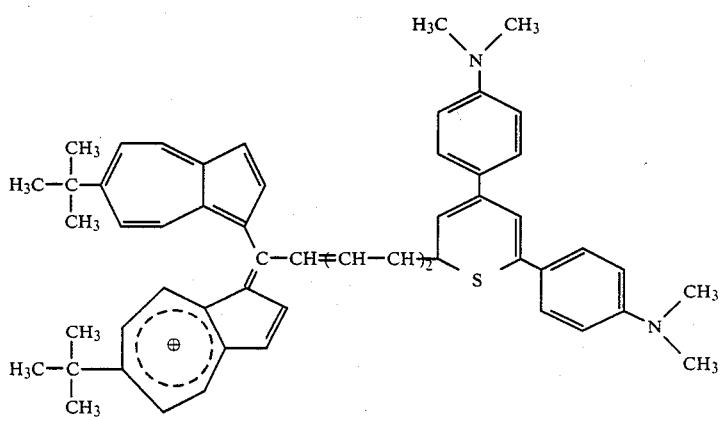

(72)

Such dyes have not only good solubility in organic solvents but also exhibit absorption peaks with large coefficient of absorption in the nearinfrared region, whereby good characteristics for optical recording medium can be obtained.

To describe now about the synthetic method of the diazulenium compound to be used in the present invention, the compounds represented by the formulae (1) and (2) can be readily obtained by allowing 1,1-azulenylmethane compounds to react with a squalic acid or a croconic acid in a suitable solvent. The compound represented by the formula (3) can be obtained by allowing 1,1-azulenylmethane compound to react with 1-formylazulene compound, 3-azulene-1'-prophenealdehyde compound or 3-azulene-1'-pentadienealdehyde compound in a suitable solvent in the presence of a strong acid. The compound represented by the formula (4) is obtained by mixing 1,1-azulenylmethane compound with orthoacetals, orthoesters, malondialdehydes or glutacondialdehydes in a suitable solvent in the presence of a strong acid. The compound represented by the formula (5) is obtained by heating 1,1-azulenylmethane compound and glyoxal in a suitable solvent in the presence of a strong acid. The compound represented by the formula (6) is obtained by heating 1,1-bis-[1-azulenyl]-ethane compound and 1,3-diformylazulene compound in a suitable solvent in the presence of a strong acid. The compound represented by the formula (7) is obtained by allowing 1,1-azulenylmethane compound to react with cyclopentanes or cyclohexanes in a suitable solvent in the presence of a strong acid. The compound represented by the formula (8) is obtained by allowing 1,1-bis-[1-azulenyl]-ethane to react with a compound represented by the following formula (14) in a suitable solvent in the presence of a strong acid.

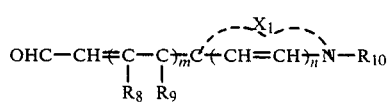

Formula (14)

In the formula, $X_1$, $R_8$, $R_9$, $R_{10}$ and m, n have the same definitions as defined above. When $m=0$, it can be obtained by allowing a compound represented by the following formula (15) to react with a compound represented by the following formula (16) by use of a suitable solvent.

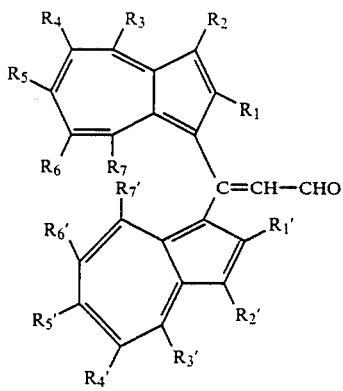

Formula (15)

In the formula, $R_1$-$R_7$ and $R_1'$ and $R_7'$ have the same definitions as defined above.

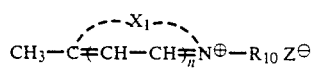

Formula (16)

In the formula, $X_1$, $R_{10}$, $Z^-$ and n have the same definitions as defined above.

When m=1 or 2, the compound represented by the formula (9) is obtained by allowing 1,1-bis[1-azulenyl]-ethane to react with a compound represented by the following formula (17) in a suitable solvent in the presence of a strong acid.

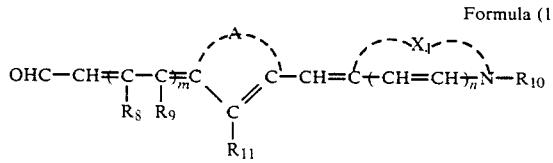

Formula (17)

In the formula, $X_1$, A, $R_8$, $R_9$, $R_{10}$, $R_{11}$ and m, n have the same definitions as defined above. When m=0, it can be obtained by allowing a compound represented by the above formula (15) to react with a compound represented by the following formula (18) in a suitable solvent.

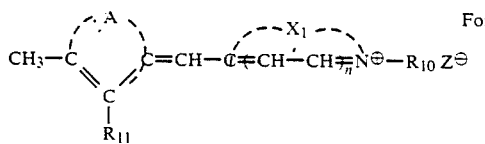

Formula (18)

In the formula, $X_1$, A, $R_{10}$, $R_{11}$, $Z^\ominus$ and n have the same definitions as defined above.

The compounds represented by the formula (10), (11) or (12) are obtained by mixing 1,1-azulenylmethane or 1,1-bis[1-azulenyl]-ethane with corresponding aldehyde compounds in a suitable solvent in the presence of a strong acid.

The compound represented by the formula (13), when m=1 or 2, is obtained by allowing 1,1-bis[1-azulenyl]-ethane to react with a compound represented by the following formula (19) in a suitable solvent in the presence of a strong acid.

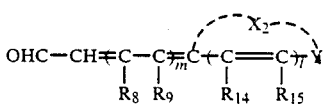

Formula (19)

In the formula, $X_2$, Y, $R_8$, $R_9$, $R_{14}$, $R_{15}$, m and l have the same definitions as defined above. When m=0, it can be obtained by allowing a compound represented by the above formula (15) to react with a compound represented by the following formula (20) in a suitable solvent.

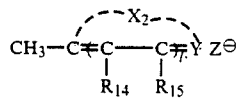

Formula (20)

In the formula, $X_2$, $Z^\ominus$, $R_{14}$, $R_{15}$ and l have the same definitions as defined above.

As the reaction solvent to be used, there may be employed alcohols such as ethanol, butanol, benzyl alcohol, etc.; nitriles such as acetonitrile, propionitrile, etc.; organic carboxylic acids such as acetic acid; acid anhydrides such as acetic anhydride; alicyclic ethers such as dioxane, tetrahydrofuran, etc. and others. Also, butanol, benzyl alcohol, etc. can be also mixed with an aromatic hydrocarbon such as benzene. The temperature during the reaction can be selected from the range of 0° C. to the boiling point.

The optical recording medium of the present invention can be made to have a structure as shown in FIG. 1. The optical recording medium shown in the same figure can be formed by providing a recording layer 2 which is an organic thin film containing a compound represented by the above formula [I], [II] or [III] on a substrate 1. Such recording layer 2 can be formed by vacuum vapor deposition of a compound represented by the above formula [I], [II] or [III] or coating of a coating solution containing such compound dissolved or dispersed in an organic solvent.

Also, in forming recording layer 2, two or more kinds of the compounds represented by the above formula [I], [II] or [III] can be used in combination, and further other dyes than the compounds of the above formula [I], [II] or [III] may be dispersed by mixing or laminated on the layer comprising the compound represented by the above formula [I], [II] or [III]. Examples of such other dyes may include diazulene type, azulene type, polymethine type, pyrylium type, squalium type, croconium type, triphenylmethane type, xanthene type, anthraquinone type, cyanine type, phthalocyanine type, dioxazine type, tetrahydrocholine type, triphenothiazine type, phenanthrene type, metal chelate complex type dyes or metal and metal compound such as Al, Te, Bi, Sn, In, Se, SnO, $TeO_2$, As, Cd, etc.

Also, the compound represented by the above formula [I], [II] or [III] may be also contained as dispersed or dissolved in a binder. Examples of the binder may include cellulose esters such as nitrocellulose, cellulose phosphate, cellulose sulfate, cellulose acetate, cellulose propionate, cellulose butyrate, cellulose myristate, cellulose palmitate, cellulose acetate propionate, cellulose acetate butyrate, etc.; cellulose ethers such as methyl cellulose, ethyl cellulose, propyl cellulose, butyl cellulose, etc.; vinyl resins such as polystyrene, polyvinyl chloride, polyvinyl acetate, polyvinyl butyral, polyvinyl acetal, polyvinyl alcohol, polyvinyl pyrrolidone, etc.; copolymer resins such as styrene-butadiene copolymer, styreneacrylonitrile copolymer, styrenebutadieneacrylonitrile copolymer, vinyl chloride-vinyl acetate copolymer, etc.; acrylic resins such as polymethyl methacrylte, polymethyl acrylate, polybutyl acrylate, polyacrylic acid, polymethacrylic acid, polyacrylamide, polyacrylonitrile, etc.; polyesters such as polyethylene terephthalate, etc.; polyallylate resins, such as poly(4,4'-isopropylidenediphenylene-co 1,4-cyclohexylenedimethylenecarbonate), poly(ethylene-dioxy-3,3'-phenylenethiocarbonate), poly(4,4'-isopropylidenediphenylenecarbonate-coterephthalate), poly(4,4'-isopropylidenediphenylenecarbonate), poly(4,4'-secbutylidenediphenylenecarbonate), poly(4,4'-isopropylidenediphenylenecarbonate-block-oxyethylene), etc.; or polyamides, polyimides, epoxy resins, phenol resins, polyolefins such as polyethylene, polypropylene, chlorinated polyethylene, etc.; and so on.

Also, in the recording layer 2, surfactants, antistatic agents, stabilizers, dispersing agents, flame retardants, lubricants, plasticizers, etc. may be contained.

Particularly, when an aminium salt compound or diimmonium salt compound as disclosed in Japanese Patent Laid-Open application No. 60-236131 is incorporated in the recording layer in addition to the diazulenium salt compound as described above, recording and reproducing characteristics and storage stability can be further improved.

The aminium salt compound and the diimmonium salt compound to be used in the present invention are represented by the following formulae [IV], [V], respectively.

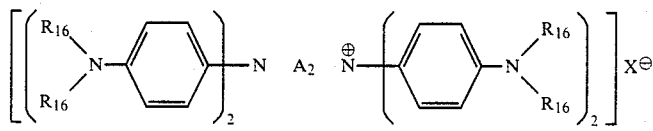

Formula [IV]

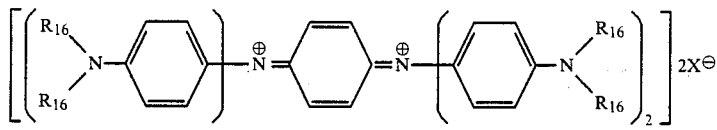

Formula [V]

In the formulae [IV], [V], $R_{16}$ represents hydrogen atom or an alkyl group (e.g. methyl, ethyl, n-propyl, iso-propyl, n-butyl, sec-butyl, iso-butyl, t-butyl, n-amino, t-amyl, n-hexyl, n-octyl, t-octyl and $C_{9-12}$ alkyl groups, etc.), and further other alkyl groups, for example, a substituted alkyl group (e.g. 2-hydroxyethyl, 3-hydroxypropyl, 4-hydroxybutyl, 2-acetoxyethyl, carboxymethyl, 2-carboxyethyl, 3-carboxypropyl, 2-sulfoethyl, 3-sulfopropyl, 4-sulfobutyl, 3-sulfatepropyl, 4-sulfatebutyl, N-(methylsulfonyl)-carbamylmethyl, 3-(acetylsulfamyl)propyl, 4-(acetylsulfamyl)butyl, etc.), a cyclic alkyl group (e.g. cyclohexyl, etc.), an alkenyl group (vinyl, allyl, propenyl, butenyl, pentenyl, hexenyl, heptenyl, octenyl, dodecynyl, prenyl, etc.), an aralkyl group (e.g. benzyl, phenetyl, α-naphthylmethyl, β-naphthylmethy, etc.), a substituted aralkyl group (e.g. carboxybenzyl, sulfobenzyl, hydroxybenzyl, etc.). $A_2$ represents

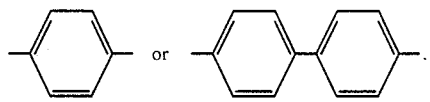

$X^{\ominus}$ represents an anion.

These aminium salt compounds and diimmonium salt compounds can be synthesized according to the synthetic methods disclosed in U.S. Pat. Nos. 3,484,467 and 3,637,769.

In the following, representative examples of the aminium salt compounds represented by the above formula [IV] are enumerated.

| Compound No. | $A_2$ | $R_{16}$ | $X^{\ominus}$ |
|---|---|---|---|
| A-1 |  | $CH_3$ | $AsF_6^{\ominus}$ |
| A-2 |  | $CH_3$ | $ClO_4^{\ominus}$ |
| A-3 |  | $CH_3$ | $SbF_6^{\ominus}$ |
| A-4 |  | $C_2H_5$ | $AsF_6^{\ominus}$ |
| A-5 |  | $C_2H_5$ | $ClO_4^{\ominus}$ |
| A-6 |  | $C_2H_5$ | $BF_4^{\ominus}$ |
| A-7 |  | n-$C_3H_7$ | $AsF_6^{\ominus}$ |
| A-8 |  | iso-$C_3H_7$ | $ClO_4^{\ominus}$ |
| A-9 |  | n-$C_4H_9$ | $ClO_4^{\ominus}$ |
| A-10 |  | n-$C_4H_9$ | $AsF_6^{\ominus}$ |
| A-11 |  | n-$C_4H_9$ | $SbF_6^{\ominus}$ |

-continued

| Compound No. | A₂ | R₁₆ | X⊖ |
|---|---|---|---|
| A-12 | –⟨phenyl⟩– | n-C₄H₉ | BF₄⊖ |
| A-13 | –⟨phenyl⟩– | n-C₄H₉ | I⊖ |
| A-14 | –⟨phenyl⟩– | n-C₄H₉ | CH₃–⟨phenyl⟩–SO₃⊖ |
| A-15 | –⟨phenyl⟩– | t-C₄H₉ | ClO₄⊖ |
| A-16 | –⟨phenyl⟩– | t-C₄H₉ | AsF₆⊖ |
| A-17 | –⟨phenyl⟩– | n-C₆H₁₃ | ClO₄⊖ |
| A-18 | –⟨phenyl⟩– | n-C₈H₁₇ | AsF₆⊖ |
| A-19 | –⟨phenyl⟩– | n-C₁₂H₂₅ | SbF₆⊖ |
| A-20 | –⟨biphenyl⟩– | CH₃ | AsF₆⊖ |
| A-21 | –⟨biphenyl⟩– | C₂H₅ | ClO₄⊖ |
| A-22 | –⟨biphenyl⟩– | C₂H₅ | AsF₆⊖ |
| A-23 | –⟨biphenyl⟩– | C₂H₅ | SbF₆⊖ |
| A-24 | –⟨phenyl⟩– | C₂H₄OH | SbF₆⊖ |
| A-25 | –⟨phenyl⟩– | C₂H₄OH | ClO₄⊖ |
| A-26 | –⟨phenyl⟩– | C₂H₄OH | NO₃⊖ |
| A-27 | –⟨biphenyl⟩– | C₂H₄OH | SbF₆⊖ |

In the following, representative examples of the diimmonium salt compounds represented by the above formula [V] are enumerated.

| Compound No. | R₁₆ | X⊖ |
|---|---|---|
| I-1 | CH₃ | AsF₆⊖ |
| I-2 | CH₃ | ClO₄⊖ |
| I-3 | CH₃ | SbF₆⊖ |
| I-4 | C₂H₅ | AsF₆⊖ |
| I-5 | C₂H₅ | ClO₄⊖ |
| I-6 | C₂H₅ | BF₄⊖ |
| I-7 | n-C₃H₇ | AsF₆⊖ |
| I-8 | iso-C₃H₇ | ClO₄⊖ |
| I-9 | n-C₄H₉ | ClO₄⊖ |
| I-10 | n-C₄H₉ | AsF₆⊖ |
| I-11 | n-C₄H₉ | SbF₆⊖ |
| I-12 | n-C₄H₉ | BF₄⊖ |
| I-13 | n-C₄H₉ | I⊖ |
| I-14 | n-C₄H₉ | CH₃–⟨phenyl⟩–SO₃⊖ |
| I-15 | t-C₄H₉ | ClO₄⊖ |
| I-16 | t-C₄H₉ | AsF₆⊖ |
| I-17 | n-C₆H₁₃ | ClO₄⊖ |
| I-18 | n-C₈H₁₇ | AsF₆⊖ |
| I-19 | n-C₁₂H₂₅ | SbF₆⊖ |
| I-20 | C₂H₄OH | SbF₆⊖ |
| I-21 | C₂H₄OH | ClO₄⊖ |
| I-22 | C₂H₄OH | NO₃⊖ |
| I-23 | C₂H₄OH | SbF₆⊖ |

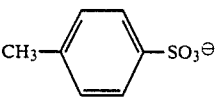

When the aminium salt compound of the above formula [IV] or the diimmonium salt compound of the formula [V] is added, the amount added may be 1 to 60 % by weight, preferably 5 to 40% by weight based on the total solid components as the standard in the recording layer 2.

The organic solvent capable of being used during coating of the recording layer 2, which may differ depending on whether a dispersed state or dissolved state is formed, may generally include alcohols such as methanol, ethanol, isopropanol, diacetone alcohol, etc.; ketones such as acetone, methyl ethyl, ketone, cyclohexanone, etc.; amides such as N,N-dimethylformamide, N,N-dimethylacetamide, etc.; sulfoxides such as dimethylsulfoxide; ethers such as tetrahydrofuran, dioxane, ethylene glycol monomethyl ether, etc.; esters such as methyl acetate, ethyl acetate, butyl acetate, etc.; aliphatic halogenated hydrocarbons such as chloroform, methylene chloride, dichloroethylene, carbon tetrachloride, trichloroethylene, etc.; aromatics such as benzene, toluene, xylene, monochlorobenzene, dichlorobenzene, etc.; or aliphatic hydrocarbons such as n-hexane, cyclohexane, ligroin, etc.

For coating, there may be employed such methods as dip coatings, spray coating, spinner coating, bead coating, Myer bar coating, blade coating, roller coating, curtain coating, etc.

The recording layer 2 may have a dry film thickness of 50 Å to 100 μm, preferably 200 Å to 1 μm.

As the substrate 1, there can be employed plastics such as polyester, acrylic resin, polycarbonate resin, polyolefin resin, phenol resin, epoxy resin, polyamide, polyimide and so forth, glass or metals.

Figure 2:
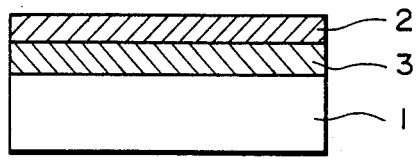
Figure 3:
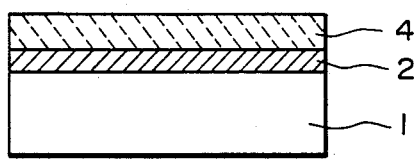
Figure 4:
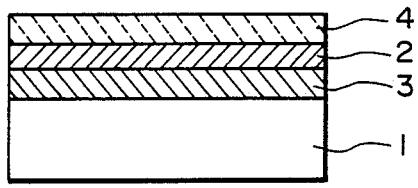

Also, the present invention can be made to have a constitution provided with a subbing layer 3 and/or a protective layer 4, as shown in FIG. 2 to FIG. 4.

The subbing layer is provided for the purpose of (a) improvement of adhesiveness, (b) as the barrier against water or gas, (c) improvement of storage stability of the recording layer, (d) improvement of reflectance, (e) protection of substrate from the solvent, (f) formation of pregroove and so forth.

For the purpose of (a), various materials such as polymeric materials, for example, ionomer resin, amide type resin, vinyl type resin, natural polymer, silicone, liquid rubber, etc. or silane coupling agents and other various materials can be used; for the purposes of (b) and (c), in addition to the above polymeric materials, inorganic compounds such as SiO2, MgF$_2$, SiO, TiO$_2$, ZnO, TiN, SiN, etc., metals or semimetals such as Zn, Cu, S, Ni, Cr, Ge, Se, Cd, Ag, Al, etc. can be used; for the purpose of (d), metals such as Al, Ag, etc. or organic thin films having metallic luster such as diazulene dye, methine dye, etc. can be used; and for the purposes of (e) and (f), UV-ray curable resins, thermosetting resins, thermoplastic resins, etc. can be used. The subbing layer may have a film thickness of 50 Å to 100 μm, preferably 200 Å to 30 μm. On the other hand, the protective layer is provided for the purpose of protecting from flaw, dust, contamination, etc., improving storage stability of the recording layer and improving reflectance, and the same material as for the subbing layer can be used for the material. The protective layer should have a film thickness of 50 Å or more, preferably 30 μm or more. In the subbing layer and/or the protective layer, the compound of the above formula [I], [II] and/or [III] of the present invention may be also contained. Also, in the subbing layer and the protective layer, stabilizers, dispersing agents, flame retardants, lubricants, antistatic agents, surfactants, plasticizers and so forth may be also incorporated, and the compound of the above formula [IV] and/or [V] may be also contained.

Further, as another constitution of the optical recording medium according to the present invention, it can be also made the so-called air sandwich structure in which two sheets of the recording medium with a constitution shown in FIG. 1 to FIG. 4 are used (or only as one sheet thereof is a substrate) and the recording layer 2 composed of an organic thin film is arranged inner side thereof and sealed through a spacer, or alternatively it can be made the so-called closely adhered structure (plastered structure) in which they are adhered through a protective layer 4 without use of a spacer.

The optical recording medium of the present invention can be recorded also by irradiation of a gas laser such as argon laser (oscillated wavelength: 488 nm), helium-neon laser (oscillated wavelength: 633 nm), helium-cadmium laser (oscillated wavelength: 442 nm) and so forth.

Also, recording is possible by irradiation of a light with ½ wavelength of the laser beam by use of SHG element and the like but preferably the recording method by irradiation of a laser beam having oscillated wavelength in the near-infrared or infrared region such as a laser having a wavelength of 650 nm or more, particularly gallium-aluminum-arsenic semiconductor laser (oscillated wavelength: 830 nm) and the forth is suitable. Also, for reading, the laser as described above can be used. In this case, writing and reading can be done with a laser with the same wavelength, or they can be done with lasers of different wavelengths.

As described above, by use of the optical recording medium according to the present invention, an optical recording medium having an organic thin film, which has high sensitivity and is also stable to heat and light, can be obtained.

EXAMPLES

The present invention is described in detail below by referring to Examples, but the present invention is not limited thereto.

EXAMPLE 1

An epoxy-acrylate type UV-ray curable resin layer of a thickness of 50 μm was formed on a polymethyl methoacrylate (hereinafter abbreviated as PMMA) substrate of 130 mm in diameter and 1.2 mm in thickness, and a pregroove of 700 Å in depth was provided by use of the 2P method (photo-polymer method). After a solution of 2 parts by weight of the above compound No. (17) dissolved in 98 parts by weight of dichloroethane was applied thereon, the coating was dried to obtain an organic thin film recording layer of 800 Å.

The thus prepared optical recording medium was mounted on a turn table, and with the turn table being rotated by a motor at 1800 rpm, an information was written on the organic thin film recording layer with a spot size of 1.5 μm in diameter, a recording power of 6 mW and a recording frequency of 2 MHz by use of an oscillated wavelength of 830 nm from the substrate side, and reproduced with a reading power of 0.8 mW, and the reproduced waveform was subjected to spectral analysis (scanning filter band width: 30 kHz) to measure a C/N ratio (carrier/noise ratio).

Next, the C/N ratio after the portion of the same recording medium recorded under the above measuring conditions was read repeatedly for $10^5$ times was measured.

Further, the transmittance (T (%): measured at 830 nm) and C/N ratio were measured after the environmental storage stability test was performed by leaving the same recording medium prepared under the above conditions to stand under the conditions of 60° C., 95% RH for 2000 hours. Also, the transmittance (T (%): measured at 830 nm) and C/N ratio were measured after the light-resistant stability test was performed by irradiating a xenon lamp light of 1000 W/m2 (300–900 nm) on the same recording medium for 70 hours.

EXAMPLES 2–15

Recording media were prepared according to the same method as in Example 1 by changing the compound No. (17) used in Example 1 to the respective compounds shown in Table 2, to prepare optical recording media of Examples 2–15, respectively.

The optical recording media of the above Examples 2–15 were measured according to the same methods as in Example 1.

EXAMPLES 16, 17

Each of the following compounds No. (73) and (74) and the above compound No. (17) at a weight ratio of 1:1 were mixed with dichloroethane, the mixture was applied according to the same method as in Example 1 to provide a recording layer which was an organic thin film with a dry film thickness of 750 A and prepare an optical recording media of Examples 16, 17, respectively. The optical recording media of Examples 16, 17 thus prepared were subjected to the same measurements according to the same methods as in Example 1.

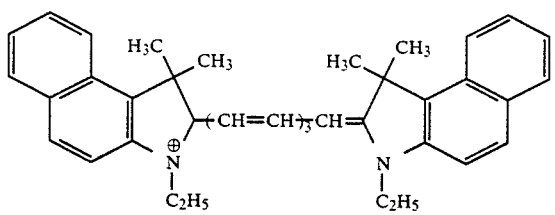

Compound No. (73)

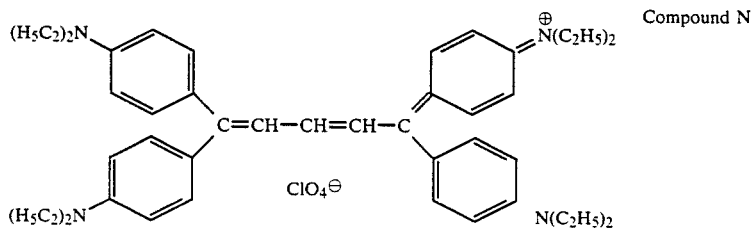

Compound No. (74)

COMPARATIVE EXAMPLE 1

An optical recording medium was prepared and measured according to the same methods as in Example 16 except for omitting the compound No. (17) used in Example 16. The above results are shown in Table 1.

(44), (53) and (66) respectively, recording media were prepared according to the same method as in Example 18 to prepare optical recording media of Examples 19-25, respectively.

The optical recording media of the above Examples 19-25 were measured according to the same method as

TABLE 1

| Example | Compound No. | Initial Stage T (%) | Initial Stage C/N (dB) | After Repeated Reproduction for $10^5$ times C/N (dB) | Environmental Storage stability 60° C., 95% RH after 2000 hours T (%) | Environmental Storage stability 60° C., 95% RH after 2000 hours C/N (dB) | Light-resistant Stability Xenon Lamp 1000 W/m² after 70 hours T (%) | Light-resistant Stability Xenon Lamp 1000 W/m² after 70 hours C/N (dB) |
|---|---|---|---|---|---|---|---|---|
| 1 | (17) | 16 | 57 | 56 | 18 | 55 | 20 | 51 |
| 2 | (3) | 12 | 58 | 56 | 18 | 53 | 20 | 50 |
| 3 | (7) | 20 | 52 | 50 | 24 | 48 | 26 | 46 |
| 4 | (12) | 30 | 45 | 44 | 32 | 42 | 36 | 40 |
| 5 | (19) | 32 | 44 | 42 | 31 | 43 | 35 | 40 |
| 6 | (21) | 16 | 56 | 55 | 18 | 53 | 21 | 51 |
| 7 | (28) | 25 | 51 | 49 | 27 | 48 | 30 | 45 |
| 8 | (30) | 18 | 54 | 51 | 19 | 54 | 21 | 51 |
| 9 | (34) | 19 | 53 | 50 | 21 | 52 | 24 | 48 |
| 10 | (43) | 17 | 55 | 52 | 20 | 53 | 23 | 48 |
| 11 | (46) | 19 | 52 | 50 | 20 | 51 | 23 | 49 |
| 12 | (50) | 24 | 50 | 46 | 26 | 48 | 30 | 45 |
| 13 | (57) | 35 | 44 | 42 | 37 | 43 | 41 | 40 |
| 14 | (64) | 22 | 55 | 51 | 22 | 55 | 26 | 51 |
| 15 | (69) | 25 | 52 | 50 | 27 | 49 | 30 | 46 |
| 16 | (17) + (73) | 19 | 54 | 51 | 23 | 52 | 25 | 48 |
| 17 | (17) + (74) | 18 | 55 | 54 | 19 | 54 | 21 | 56 |
| Comparative Example 1 | (73) | 20 | 47 | 40 | 35 | 36 | 41 | 32 |

EXAMPLE 18

A mixture obtained by mixing 2 parts by weight of the above compound No. (2) and 1 part by weight of a nitrocellulose resin (OH-less Lacquer, produced by Daiseru Kagaku K. K.) in 97 parts by weight of methyl ethyl ketone was applied by the spinner coating method on a PMMA substrate of 130 mm in diameter and 1.2 mm in thickness provided with a pregroove to obtain an organic thin film recording layer with a dry film thickness of 1000 Å.

The optical recording medium thus prepared was subjected to measurement according to the same methods as in Example 1.

EXAMPLES 19-25

By changing the compound No. (2) used in Example 18 to the above compounds No. (16), (26), (31), (36), in Example 18.

EXAMPLES 26, 27

The above compounds No. (1) and No. (22) in amounts of 500 mg were placed in a molybdenum boat for vapor deposition, and after evacuated to $1 \times 10^{-6}$ mmHg, vapor deposition was effected on a PMMA substrate of 130 mm in diameter and 1.2 mm in thickness. An organic thin film recording layer of 950 Å was formed while controlling the heater so that the pressure within the vacuum chamber was not elevated to $10^{-5}$ mmHg or higher during vapor deposition, to prepare optical recording media of Examples 26, 27, respectively.

The optical recording media thus prepared were measured according to the same methods as in Example 1. The above results are shown in Table 2.

TABLE 2

| Example | Compound No. | Initial Stage T (%) | Initial Stage C/N (dB) | After Repeated Reproduction for $10^5$ times C/N (dB) | Environmental Storage stability 60° C., 95% RH after 2000 times T (%) | Environmental Storage stability 60° C., 95% RH after 2000 times C/N (dB) | Light-resistant Stability Xenon Lamp 1000 W/$m^2$ after 70 hours T (%) | Light-resistant Stability Xenon Lamp 1000 W/$m^2$ after 70 hours C/N (dB) |
|---|---|---|---|---|---|---|---|---|
| 18 | (2) | 19 | 54 | 52 | 21 | 52 | 23 | 50 |
| 19 | (16) | 25 | 51 | 49 | 28 | 47 | 30 | 45 |
| 20 | (26) | 18 | 5 | 54 | 20 | 54 | 24 | 51 |
| 21 | (31) | 24 | 52 | 49 | 25 | 52 | 28 | 47 |
| 22 | (36) | 17 | 53 | 50 | 19 | 52 | 21 | 48 |
| 23 | (44) | 21 | 52 | 49 | 24 | 50 | 28 | 46 |
| 24 | (53) | 23 | 50 | 48 | 26 | 48 | 29 | 44 |
| 25 | (66) | 17 | 54 | 53 | 18 | 53 | 22 | 50 |
| 26 | (1) | 23 | 54 | 53 | 25 | 53 | 28 | 48 |
| 27 | (22) | 21 | 54 | 52 | 24 | 52 | 29 | 47 |

EXAMPLE 28

On a substrate of a polycarbonate (hereinafter abbreviated as PC) of wallet size with a thickness of 0.4 mm, a pregroove was provided by the hot press method and a solution of the above compound No. (26) mixed in 96 parts by weight of diacetone alcohol was applied by the bar coating method, followed by drying to obtain an organic thin film recording layer of 900 Å. Further, on the recording layer through an ethylene-vinyl acetate dry film, a PC substrate of wallet size with a thickness of 0.3 mm was provided by the hot roll method to prepare an optical recording medium of Example 28 having a closely adhered structure.

The optical recording medium of Example 28 thus prepared was mounted on a stage driven in the X-Y direction, and information was written on the organic thin film recording layer from the side of the PC substrate with a thickness of 0.4 mm by use of a semiconductor laser of an oscillated wavelength of 830 nm in the Y-axis direction with a spot size of 30 μm in diameter, a recording power of 4.0 mW, and a recording pulse of 80 μsec, and reproduced with a reading power of 0.4 mW, and its contrast ratio ((A-B)/A:A→intensity at the unrecorded portion, B→signal intensity at the recorded portion) was measured.

Further, the same recording medium prepared under the above conditions was subjected to the environmental storage stability test and lightresistant stability test under the same conditions as in Example 1, and transmittance and the contrast ratio thereafter were measured. The results are shown in Table 3.

TABLE 3

| Example | Compound No. | Initial Stage T (%) | Initial Stage C/N (dB) | Environmental Storage Stability 60° C. 90% RH After 2000 hours T (%) | Environmental Storage Stability 60° C. 90% RH After 2000 hours C/N (dB) | Light-resistant Stability Xenon Lamp 1000 W/$m^2$ After 70 hours T (%) | Light-resistant Stability Xenon Lamp 1000 W/$m^2$ After 70 hours C/N (dB) |
|---|---|---|---|---|---|---|---|
| (28) | (26) | 15 | 0.72 | 16 | 0.71 | 21 | 0.65 |

EXAMPLE 29

On a PMMA substrate of 130 mm in diameter and 1.2 mm in thickness, an epoxy-acrylate type UV-ray curable resin layer was provided to a thickness of 50 μm, and a pregroove of 700 Å in depth was provided by use of the 2P method (photo-polymer method). After a solution of the above diazulenium salt compound No. (17) and the above aminium salt compound No. A-9 at a weight ratio of 80:20 dissolved in 1,2-dichloroethane was applied thereon by the spinner coating method, the coating was dried to obtain an organic thin film recording layer of 850 Å.

The thus prepared optical recording medium was mounted on a turn table, and with the turn table being rotated by a motor at 1800 rpm, an information was written on the organic thin film recording layer with a spot size of 1.5 μm in diameter, a recording power of 6 mW and a recording frequency of 2 MHz by use of a semiconductor laser of an oscillated wavelength of 830 nm from the substrate side, and reproduced with a reading power of −1.0 mW, and the reproduced waveform was subjected to spectral analysis (scanning filter band width: 30 kHz) to measure a C/N ratio (carrier/noise ratio).

Next, the C/N ratio after the portion of the same recording medium recorded under the above measuring conditions was read repeatedly for $10^6$ times was measured.

Further, the reflectance (R (%): measured at 830 nm) and C/N ratio was measured after the environmental storage stability test was performed by leaving the same recording medium prepared under the above conditions to stand under the conditions of 60° C., 90% RH for 3000 hours.

Also, the reflectance (R (%): measured at 830 nm) and C/N ratio were measured after the light-resistance stability test was performed by irradiating a xenon lamp light of 1000 W$m^2$ (300–900 nm) on the same recording medium for 100 hours.

EXAMPLES 30–36

By changing the diazulenium salt compound (AZ) and the aminium salt compound (A) used in Example 29 to the combinations shown below in Table 4, recording media were prepared according to the same method as in Example 29 to provide optical recording media of Examples 30–36, respectively.

The optical recording media of the above Examples 30–36 were measured according to the same methods as in Example 1.

TABLE 4

| Example | Diazulenium Compound (AZ) | Aminium Salt Compound (A) | Weight Ratio (AZ:A) |
|---|---|---|---|
| 30 | (2) | A-1 | 80:20 |
| 31 | (9) | A-12 | 70:30 |
| 32 | (12) | A-21 | 80:20 |
| 33 | (22) | A-26 | 85:15 |

TABLE 4-continued

| Example | Diazulenium Compound (AZ) | Aminium Salt Compound (A) | Weight Ratio (AZ:A) |
|---|---|---|---|
| 34 | (30) | A-5 | 80:20 |
| 35 | (43) | A-10 | 85:15 |
| 36 | (51) | A-19 | 90:10 |

EXAMPLES 37–40

A mixture of 4 parts by weight of a mixture according to the combination of the diazulenium salt compound (AZ) and the aminium salt compound (A) shown below in Table 5 and 1 part by weight of a nitrocellulose resin (OH-less Lacquer, produced by Daiseru Kagaku K. K.) mixed in 95 parts by weight of methyl ethyl ketone was applied by the spinner coating method on a polycarbonate substrate of 130 mm in diameter and 1.2 mm in thickness provided with a pregroove to obtain an organic thin film recording layer with a dry film thickness of 950 Å.

The optical recording medium thus prepared was measured according to the same methods as in Example 29.

TABLE 5

| Example | Diazulenium Compound (AZ) | Aminium Salt Compound (A) | Weight Ratio (AZ:A) |
|---|---|---|---|
| 37 | (16) | A-11 | 70:30 |
| 38 | (18) | A-4 | 75:25 |
| 39 | (27) | A-13 | 85:15 |
| 40 | (34) | A-18 | 80:20 |

The above results are shown in Table 6.

TABLE 6

| | Initial Stage | | After Repeated Reproduction for $10^6$ times | Environmental Storage Stability 60° C. 90% RH After 3000 hours | | Light-resistant Stability Xenon Lamp 1000 W/m² After 100 hours | |
|---|---|---|---|---|---|---|---|
| Example | R (%) | C/N (dB) | C/N (dB) | R (%) | C/N (dB) | R (%) | C/N (dB) |
| 29 | 26 | 56 | 54 | 24 | 55 | 22 | 52 |
| 30 | 27 | 55 | 53 | 24 | 54 | 23 | 51 |
| 31 | 24 | 53 | 52 | 22 | 52 | 20 | 49 |
| 32 | 25 | 50 | 49 | 24 | 47 | 22 | 47 |
| 33 | 24 | 52 | 50 | 23 | 50 | 20 | 47 |
| 34 | 23 | 51 | 49 | 22 | 48 | 20 | 47 |
| 35 | 25 | 53 | 51 | 23 | 52 | 21 | 48 |
| 36 | 22 | 50 | 47 | 21 | 49 | 18 | 46 |
| 37 | 23 | 52 | 50 | 20 | 50 | 17 | 48 |
| 38 | 24 | 49 | 46 | 21 | 48 | 16 | 45 |
| 39 | 24 | 54 | 53 | 23 | 54 | 20 | 51 |
| 40 | 24 | 52 | 50 | 21 | 50 | 19 | 49 |

EXAMPLES 41–44

On a substrate of a polycarbonate (hereinafter abbreviated as PC) of wallet size with a thickness of 0.4 mm, a pregroove was provided by the hot press method and a solution of the azulenium salt compound and the aminium salt compound shown below in Table 7 mixed in diacetone alcohol was applied by the bar coating method, followed by drying to obtain an organic thin film recording layer of 850 Å. Further, on the recording layer through an ethylene-vinyl acetate dry film, a PC substrate of wallet size with a thickness of 0.3 mm was provided by the hot roll method to prepare optical recording media having a closely adhered structure.

The optical recording media of Examples 41–44 thus prepared were mounted on a stage driven in the X-Y direction, and information was written on the organic thin film recording layer from the side of the PC substrate with a thickness of 0.4 mm by use of a semiconductor laser of an oscillated wavelength of 830 nm in the Y-axis direction with a spot size of 30 μm in diameter, a recording power of 4.0 mW, and a recording pulse of 80 usec, and reproduced with a reading power of 0.4 mW, and its contrast ratio ((A-B)/A:A→intensity at the unrecorded portion, B→ signal intensity at the recorded portion) was measured.

Further, the same recording media prepared under the above conditions were subjected to the environmental storage stability test and light-resistant stability test under the same conditions as in Example 29, and reflectance and the contrast ratio thereafter were measured. The results are shown in Table 8.

TABLE 7

| Example | Diazulenium Compound (AZ) | Aminium Salt Compound (A) | Weight Ratio (AZ:A) |
|---|---|---|---|
| 41 | (3) | A-10 | 80:20 |
| 42 | (17) | A-4 | 75:25 |
| 43 | (26) | A-16 | 80:20 |
| 44 | (66) | A-7 | 85:15 |

TABLE 8

| | Initial Stage | | Environmental Storage Stability 60° C. 90% RH After 3000 hours | | Light-resistant Stability Xenon Lamp 1000 W/m² After 100 hours | |
|---|---|---|---|---|---|---|
| Example | R (%) | C/N (dB) | R (%) | C/N (dB) | R (%) | C/N (dB) |
| 41 | 19 | 0.83 | 18 | 0.82 | 16 | 0.77 |
| 42 | 21 | 0.84 | 20 | 0.83 | 18 | 0.76 |
| 43 | 17 | 0.75 | 15 | 0.75 | 14 | 0.72 |
| 44 | 18 | 0.78 | 16 | 0.77 | 15 | 0.74 |

EXAMPLES 45–51

Recording media were prepared by the same method as in Example 1 according to the combinations shown in Table 9 by changing the aminium salt compound used in Example 1 to the diimmonium salt compound, to prepare optical recording media of Examples 45–51, respectively.

The above optical recording media of the above Examples 45–51 were measured according to the same method as in Example 1.

TABLE 9

| Example | Diazulenium Compound (AZ) | Diimmonium Salt Compound (I) | Weight Ratio (AZ:I) |
|---|---|---|---|
| 45 | (3) | I-9 | 80:20 |
| 46 | (14) | I-12 | 85:15 |
| 47 | (21) | I-5 | 80:20 |
| 48 | (26) | I-10 | 70:30 |
| 49 | (36) | I-19 | 60:40 |
| 50 | (44) | I-1 | 80:20 |
| 51 | (61) | I-21 | 90:10 |

EXAMPLES 52–55

Recording media were prepared by the same method as in Example 1 according to the combinations shown in Table 10 by changing the aminium salt compound (A) used in Example 37 to the diimmonium salt compound (D) to obtain optical recording media of Examples 52–55, respectively.

The above optical recording media of the above Examples 52–55 were measured according to the same method as in Example 1.

TABLE 10

| Example | Diazulenium Compound (AZ) | Diimmonium Salt Compound (I) | Weight Ratio (AZ:I) |
|---|---|---|---|
| 52 | (10) | I-4 | 80:20 |
| 53 | (30) | I-13 | 90:10 |
| 54 | (43) | I-18 | 75:25 |
| 55 | (68) | I-11 | 85:15 |

The above results are shown in Table 11.

TABLE 11

| Example | Initial Stage R (%) | Initial Stage C/N (dB) | After Repeated Reproduction for $10^6$ times C/N (dB) | Environmental Storage Stability 60° C. 95% RH After 3000 hours R (%) | Environmental Storage Stability 60° C. 95% RH After 3000 hours C/N (dB) | Light-resistant Stability Xenon Lamp 1000 W/m² After 100 hours R (%) | Light-resistant Stability Xenon Lamp 1000 W/m² After 100 hours C/N (dB) |
|---|---|---|---|---|---|---|---|
| 45 | 25 | 54 | 53 | 24 | 54 | 21 | 51 |
| 46 | 25 | 55 | 52 | 23 | 53 | 21 | 52 |
| 47 | 26 | 55 | 53 | 24 | 54 | 22 | 50 |
| 48 | 25 | 56 | 55 | 24 | 55 | 23 | 52 |
| 49 | 22 | 51 | 50 | 20 | 49 | 18 | 47 |
| 50 | 23 | 52 | 50 | 21 | 49 | 20 | 49 |
| 51 | 24 | 53 | 52 | 22 | 51 | 20 | 50 |
| 52 | 24 | 54 | 51 | 22 | 53 | 20 | 49 |
| 53 | 22 | 50 | 48 | 21 | 49 | 19 | 47 |
| 54 | 23 | 53 | 51 | 21 | 50 | 19 | 49 |
| 55 | 24 | 53 | 52 | 23 | 52 | 20 | 50 |

EXAMPLES 56–59

Recording media were prepared by the same method as in Example 41 according to the combinations shown in Table 12 by changing the aminium salt compound (A) used in Example 41 to the diimmonium salt compound (I) to obtain optical recording media of Examples 56–59, respectively.

The optical recording media of the above Examples 56–59 were measured according to the same methods as in Example 1.

The results are shown in Table 13.

TABLE 12

| Example | Diazulenium Compound (AZ) | Diimmonium Salt Compound (I) | Weight Ratio (AZ:I) |
|---|---|---|---|
| 56 | (21) | I-10 | 80:20 |
| 57 | (36) | I-7 | 85:15 |
| 58 | (46) | I-4 | 75:25 |
| 59 | (63) | I-16 | 80:20 |

TABLE 13

| Example | Initial Stage R (%) | Initial Stage C/N (dB) | Environmental Storage Stability 60° C. 95% RH After 3000 hours R (%) | Environmental Storage Stability 60° C. 95% RH After 3000 hours C/N (dB) | Light-resistant Stability Xenon Lamp 1000 W/m² After 1000 hours R (%) | Light-resistant Stability Xenon Lamp 1000 W/m² After 1000 hours C/N (dB) |
|---|---|---|---|---|---|---|
| 56 | 17 | 0.80 | 16 | 0.80 | 14 | 0.75 |
| 57 | 18 | 0.82 | 16 | 0.80 | 15 | 0.76 |
| 58 | 16 | 0.80 | 15 | 0.78 | 13 | 0.75 |
| 59 | 19 | 0.83 | 17 | 0.81 | 16 | 0.78 |

What is claimed is:

1. An optical recording media having a recording layer provided on a substrate, said recording layer comprising an organic thin film containing at least one diazulenium salt compound represented by the formula [I], [II] or [III] shown below:

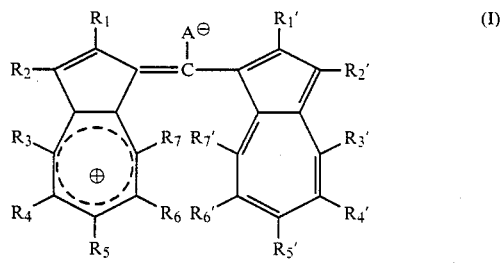

(I)

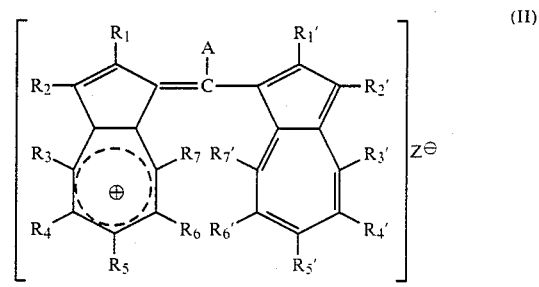

(II)

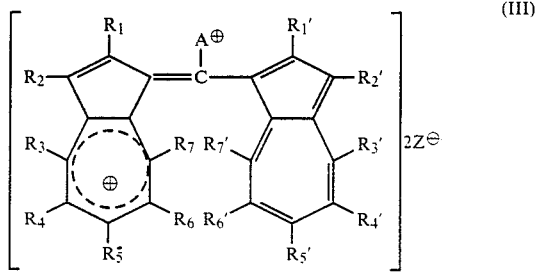

(III)

wherein $R_1$–$R_7$ and $R_1'$–$R_7'$ each represent hydrogen atom, a halogen atom or monovalent organic residue, or at least one combination of the combinations of $R_1$ and $R_2$, $R_2$ and $R_3$, $R_3$ and $R_4$, $R_4$ and $R_5$, $R_5$ and $R_6$, $R_6$ and $R_7$, $R_1'$ and $R_2'$, $R_2'$ and $R_3'$, $R_3'$ and $R_4'$, $R_4'$ and $R_5'$, $R_5'$ and $R_6'$, $R_6'$ and $R_7'$ may form a substituted or an unsubstituted fused ring; A represents a monovalent organic residue conjugated with the diazulenium salt nucleus and $z^\ominus$ represents an anion residue.

2. An optical recording medium according to claim 1, wherein said recording layer contains at least one of aminium salt compounds or diimmonium salt compounds.

3. An optical recording medium according to claim 2, wherein said aminium salt compound is represented by the formula [IV] shown below:

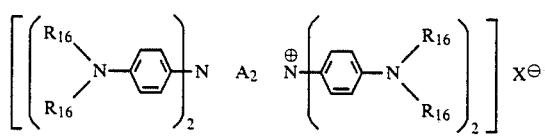

wherein $R_{16}$ represents hydrogen atom or an alkyl group, $A_2$ represents

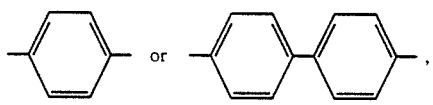

and $X^{\ominus}$ represents an anion.

4. An optical recording medium according to claim 2, wherein said diimmonium salt compound is represented by the formula [V] shown below:

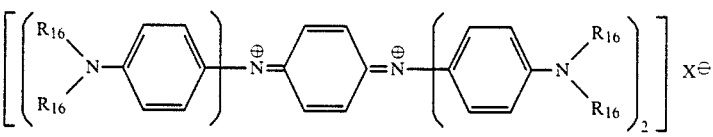

wherein $R_{16}$ and $X^{\ominus}$ are the same as defined above.

5. An optical recording medium according to claim 1, wherein said organic thin film has a dry film thickness of 50 Å to 100 μm.

6. An optical recording medium according to claim 5, wherein said organic thin film has a dry film thickness of 200 Å to 1 μm.

7. An optical recording medium according to claim 2, wherein the amount of said aminium salt compound or said diimmonium salt compound is 1 to 60% by weight based on the total solid components as the standard in said recording layer.

8. An optical recording medium according to claim 7, wherein the amount of said aminium salt compound or said diimmonium salt compound is 5 to 40% by weight based on the total solid components as the standard in said recording layer.

9. A recording method of an optical recording medium, which comprises using an optical recording medium having a recording layer provided on a substrate, said recording layer comprising an organic thin film containing at least one diazulenium salt compound represented by the formula [I], [II] or [III] shown below and performing recording by irradiating a semiconductor laser on said recording layer:

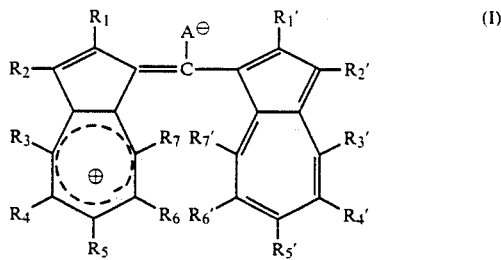

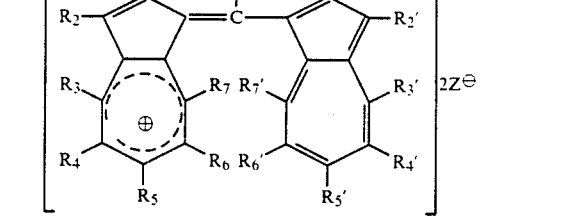

wherein $R_1$-$R_7$ and $R_1'$-$R_7'$ each represent hydrogen atom, a halogen atom or monovalent organic residue, or at least one combination of the combinations of $R_1$ and $R_2$, $R_2$ and $R_3$, $R_3$ and $R_4$, $R_4$ and $R_5$, $R_5$ and $R_6$, $R_6$ and $R_7$, $R_1'$ and $R_2'$, and $R_2'$ and $R_3'$, $R_3'$ and $R_4'$, $R_4'$ and $R_5'$, $R_5'$ and $R_6'$, $R_6'$ and $R_7'$ may form a substituted or an unsubstituted fused ring; A represents a monovalent organic residue conjugated with the diazulenium salt nucleus and $z^{\ominus}$ represents an anion residue.

* * * * *

UNITED STATES PATENT AND TRADEMARK OFFICE
CERTIFICATE OF CORRECTION

PATENT NO. : 4,921,780
DATED : May 1, 1990
INVENTOR(S) : YOSHIHIRO OGUCHI ET AL.

It is certified that error appears in the above-identified patent and that said Letters Patent is hereby corrected as shown below:

AT [57] ABSTRACT delete "represented by the formula [I], [II] or [III],"

COLUMN 2

Line 50 "$R_1$ and $R_2$'," should read --$R_1$' and $R_2$',

COLUMN 3

Line 32, "dimethylaminophtnylazo," should read --dimethylaminophenylazo,--.
    Line 49, "may" should read --may be--.

COLUMN 5

Line 32, "$\diagup\!\!\!\!\diagdown R_4$" should read --$\diagup\!\!\!\!\diagdown R_5$--.

COLUMN 6

Line 44, "δ-naphthylmethyl)," should read --β-naphthylmethyl),--.

COLUMN 29

Formula 43, "$BF_4^{\ominus}$" should read --$ClO_4^{\ominus}$--.

COLUMN 49

Line 66, "β-naphthylmethy," should read --β-naphthylmethyl,--.

UNITED STATES PATENT AND TRADEMARK OFFICE
CERTIFICATE OF CORRECTION

PATENT NO. : 4,921,780
DATED : May 1, 1990
INVENTOR(S) : YOSHIHIRO OGUCHI ET AL.

It is certified that error appears in the above-identified patent and that said Letters Patent is hereby corrected as shown below:

COLUMN 52

Line 47, "coatings," should read --coating,--.

COLUMN 55

Line 10, --$C\ell O_4^{\ominus}$-- should be inserted.

COLUMN 57

Line 45, "lightresistant" should read --light resistant--.

COLUMN 62

Line 15, "optical recording media" should read --optical recording medium--.

COLUMN 63

Line 20, "$X^{63}$" should read --$X^{\ominus}$--.
Line 30, "$X^{\ominus}$" should read --$2X^{\ominus}$--.

UNITED STATES PATENT AND TRADEMARK OFFICE
CERTIFICATE OF CORRECTION

PATENT NO. : 4,921,780

DATED : May 1, 1990

INVENTOR(S) : YOSHIHIRO OGUCHI ET AL.

It is certified that error appears in the above-identified patent and that said Letters Patent is hereby corrected as shown below:

COLUMN 64

Line 49, "and" (second occurrence) should be deleted.

Signed and Sealed this

Seventh Day of April, 1992

Attest:

HARRY F. MANBECK, JR.

Attesting Officer   Commissioner of Patents and Trademarks